US010710488B2

(12) United States Patent
Hambardzumyan et al.

(10) Patent No.: US 10,710,488 B2
(45) Date of Patent: Jul. 14, 2020

(54) LIFT PLATFORM WITH LOCK AND RELEASE SYSTEM

(71) Applicant: MAXON INDUSTRIES, INC., Santa Fe Springs, CA (US)

(72) Inventors: Levon Hambardzumyan, Glendale, CA (US); Michael Carmenaty, South Gate, CA (US)

(73) Assignee: MAXON INDUSTRIES, INC., Santa Fe Springs, CA (US)

(*) Notice: Subject to any disclaimer, the term of this patent is extended or adjusted under 35 U.S.C. 154(b) by 482 days.

(21) Appl. No.: 15/033,552

(22) PCT Filed: Oct. 29, 2014

(86) PCT No.: PCT/US2014/062982
§ 371 (c)(1),
(2) Date: Apr. 29, 2016

(87) PCT Pub. No.: WO2015/066226
PCT Pub. Date: May 7, 2015

(65) Prior Publication Data
US 2016/0272102 A1 Sep. 22, 2016

Related U.S. Application Data

(60) Provisional application No. 61/897,726, filed on Oct. 30, 2013.

(51) Int. Cl.
*E05B 63/24* (2006.01)
*B60P 1/44* (2006.01)

(52) U.S. Cl.
CPC .................. *B60P 1/4421* (2013.01)

(58) Field of Classification Search
CPC .............................. E05B 85/22; E05B 63/246
USPC ....... 292/137, 156, 157, 163, 164, 177, 179, 292/DIG. 29, DIG. 44, 94; 414/540
See application file for complete search history.

(56) References Cited

U.S. PATENT DOCUMENTS

| | | |
|---|---|---|
| 760,528 A | 5/1904 | Davies |
| 1,315,266 A | 9/1919 | Weiland |
| 3,764,030 A | 10/1973 | Randall |
| 4,124,130 A | 11/1978 | Rohrs et al. |
| 5,125,695 A | 6/1992 | Hartwell |
| 5,449,267 A | 9/1995 | Ablabutyan |
| 6,447,040 B1 | 9/2002 | Young, Sr. |
| 6,764,123 B1 | 7/2004 | Bilyard |
| 7,172,222 B1 * | 2/2007 | Hotovy ............... E05C 1/04 292/137 |

(Continued)

*Primary Examiner* — Saul Rodriguez
*Assistant Examiner* — Willie Berry, Jr.
(74) *Attorney, Agent, or Firm* — Brooks Acordia IP Law, PC; Michael Zarrabian

(57) ABSTRACT

Embodiments of a lift gate include comprise a foldable lift platform including multiple sections that are rotatable relative to one another for folding and unfolding the lift platform, a lifting mechanism for supporting and moving the lift platform, and at least one lift platform locking mechanism coupled to two adjacent sections of the lift platform to lock and unlock two adjacent sections of the lift platform together. The locking mechanism has a locked position and an unlocked position, such that in the locked position the locking mechanism restricts rotation of the two adjacent sections relative to one another.

20 Claims, 21 Drawing Sheets

(56) References Cited

U.S. PATENT DOCUMENTS

| | | | |
|---|---|---|---|
| 9,481,282 B2* | 11/2016 | Walker | B60P 1/435 |
| 2003/0127873 A1 | 7/2003 | Reed | |
| 2011/0101706 A1* | 5/2011 | Wells | E05B 63/248 |
| | | | 292/179 |
| 2013/0136567 A1* | 5/2013 | Hambardzumyan | F16C 11/10 |
| | | | 414/540 |
| 2015/0008682 A1* | 1/2015 | Stile | E05B 15/022 |
| | | | 292/145 |

* cited by examiner

LIFT PLATFORM WITH LOCK AND RELEASE SYSTEM

CROSS-REFERENCE TO RELATED APPLICATION

This application is a 35 U.S.C § 371 National Stage Entry of International Application No. PCT/US2014/062982, filed Oct. 29, 2014, which claims priority benefit of U.S. Provisional Patent Application Ser. No. 61/897,726, filed Oct. 30, 2013, both of which are incorporated herein by reference.

FIELD OF THE INVENTION

The embodiments disclosed herein relate generally to lift gates, and in particular to lift gates with folding platforms.

DESCRIPTION OF RELATED ART

Lifts such as lift gates are typically mounted at a structure such as the rear of a truck to lift payloads on a platform from one level (e.g., ground level) up to another level (e.g., the bed of the vehicle), or vice versa. A common type of lift, known as a stow lift (tuck under lift), includes a lift platform that is stowed under the vehicle bed when not in use, and can be unstowed when needed. In this type of lift, the platform is foldable and is linked to an actuator which can raise and lower the platform, as well as stow and unstow the platform. The lift platform includes folding sections that are folded onto one another when no longer needed to raise/lower loads.

In another typical lift gate, a dual lift system comprises a parallel pair of vertically extending columns, each having a vertically disposed hydraulic cylinder for vertically raising and lowering a load carried on a lift platform by the pair of cylinders. The pair of cylinders are actuated from a single source of hydraulic power and the hydraulic circuit contains a flow divider distributing hydraulic flow to each of the cylinders. The columns contain a corresponding pair of vertically disposed hydraulic cylinders having runners interconnected by a transverse stabilizing bar typically supporting a multiple-section foldable platform actuated on each side by an actuating linkage system. The lift platform includes folding sections that are folded onto one another when no longer needed to raise/lower loads.

BRIEF SUMMARY OF THE INVENTION

In one embodiment, a lift gate comprise a foldable lift platform including multiple sections that are rotatable relative to one another for folding and unfolding the lift platform, and a lifting mechanism for supporting and moving the lift platform, and at least one lift platform locking mechanism coupled to two adjacent sections of the lift platform to lock and unlock said two adjacent sections together. The locking mechanism includes a locked position whereby the locking mechanism restricts rotation of said two adjacent sections relative to one another.

In one embodiment, the locking mechanism comprises a main body coupled to a first of said two adjacent sections and a bolt holder coupled to a second of said two adjacent sections, wherein the main body slidably maintains at least a mid portion of an elongated bolt. In the locked position, an end portion of the bolt is maintained by the bolt holder, thereby restricting rotation of said two adjacent sections relative to one another.

In one embodiment, the main body comprises a housing having spaced opposing end walls, each end wall having an opening for slidably receiving the bolt, and a bolt lever transversely fixed to a portion of the bolt for sliding the bolt within the housing between the end walls.

In one embodiment, the bolt lever protrudes from an elongated opening in the housing, the elongated opening having a retaining structure at an end thereof for releasably engaging the bolt lever in a locked position of the lift platform locking mechanism. In one embodiment, the main body further includes a biasing member for urging the bolt handle against the retaining structure in the locked position of the locking mechanism.

In one embodiment, the lift platform locking mechanism further includes an unlocked position. The bolt lever protrudes from an elongated opening in the housing, the elongated opening having a first retaining structure and a second retaining structure at opposing ends thereof, for releasably engaging the bolt lever in locked and unlocked positions of the lift platform locking mechanism, respectively.

In one embodiment, the main body further includes a first biasing member for urging the bolt handle against the first retaining structure in the locked position of the locking mechanism, and a second biasing member for urging the bolt handle against the second retaining structure in the unlocked position of the locking mechanism.

In another embodiment, a lift platform locking mechanism for coupling to a lift platform of a lift gate is provided wherein the lift platform having multiple sections that are rotatable relative to one another for folding and unfolding the lift platform. The lift platform locking mechanism comprises a main body, an elongated bolt, the main body slidably maintaining at least a mid portion of the elongated bolt, and a bolt holder for slidably receiving a portion of the elongated bolt. The lift platform locking mechanism is configured for coupling to two adjacent sections of the lift platform to lock and unlock said two adjacent sections together.

The main body is configured for coupling to a first of said two adjacent sections, and the bolt holder is configured for coupling to a second of said two adjacent sections. Wherein the locking mechanism has a locked position, such that when the lift platform locking mechanism is in the locked position, an end portion of the bolt is engaged by the bolt holder, thereby restricting rotation of said two adjacent sections relative to one another. When the lift platform locking mechanism is not in the locked position, the bolt is disengaged from the bolt holder, thereby allowing rotation of said two adjacent sections relative to one another. When the lift platform locking mechanism is not in the locked, the lift platform locking mechanism can be either in a neutral position or an unlocked position.

In one embodiment, the elongated bolt is slidable within the main body, such that in the locked position, an end portion of the bolt is maintained within an opening in the bolt holder, thereby restricting rotation of said two adjacent sections relative to one another.

In one embodiment, the main body comprises a housing having opposing end walls, each end wall having an opening for slidably receiving the bolt, such that a mid portion of the bolt is maintained in the housing between said opposing end walls.

In one embodiment, the main body further comprises a bolt lever transversely fixed to a mid portion of the bolt maintained in the housing between said opposing end walls, for sliding the bolt within the housing between said end walls.

In one embodiment, the bolt lever protrudes from an elongated opening in the housing, the elongated opening having a first retaining structure and a second retaining structure at opposing ends thereof.

In one embodiment, the first retaining structure is configured for releasably engaging and maintaining the bolt lever in the locked position of the lift platform locking mechanism, and the second retaining structure is configured for releasably engaging and maintaining the bolt lever in an unlocked position of the lift platform locking mechanism.

In one embodiment, the main body further includes a first biasing member for urging the bolt handle against the first retaining structure in the locked position of the locking mechanism, wherein the first biasing member is maintained between the bolt handle and a first end wall of the housing. The main body further includes a second biasing member for urging the bolt handle against the second retaining structure in the unlocked position of the locking mechanism, wherein the second biasing member is maintained between the bolt handle and a second end wall of the housing.

In one embodiment, to release the bolt handle from the first retaining structure, the bolt handle is manually urged against the first biasing member and rotated away from the first retaining structure to disengage the bolt handle from the first retaining structure, such that upon disengagement of the bolt handle from the first retaining structure the first biasing member urges the bolt handle to slide the bolt to a neutral position in the main body. To release the bolt handle from the second retaining structure, the bolt handle is manually urged against the second biasing member and rotated away from the second retaining structure to disengage the bolt handle from the second retaining structure, such that upon disengagement of the bolt handle from the second retaining structure the second biasing member urges the bolt handle to slide the bolt to a neutral position in the main body, between the locked and unlocked positions.

These and other features, aspects and advantages of the present invention will become understood with reference to the following description, appended claims and accompanying figures.

DETAILED DESCRIPTION

Figure 1:
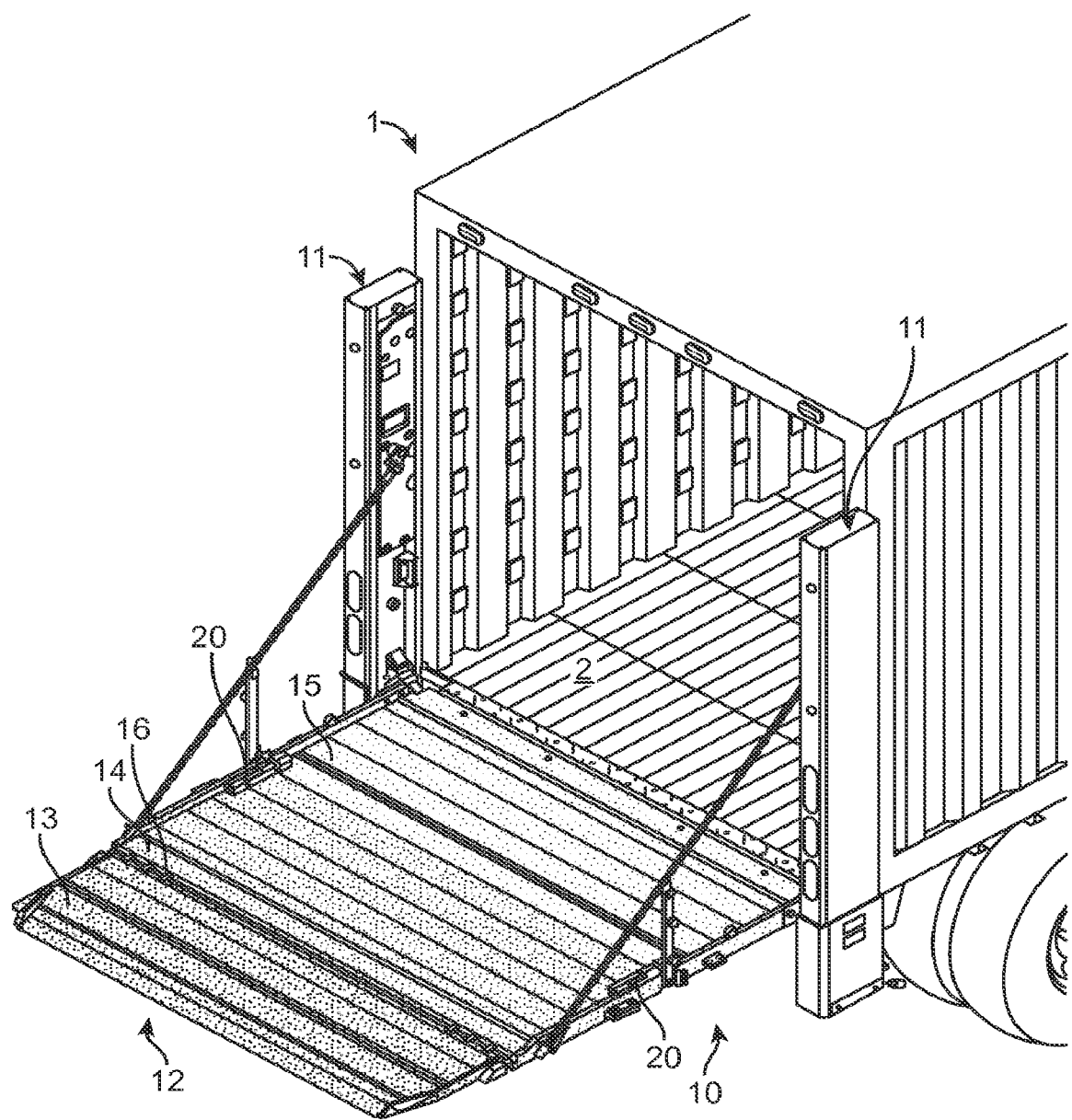
FIG. 1 shows a perspective view of a lift gate system with a foldable lift platform and platform lock and release mechanisms, mounted at the rear of a freight vehicle or truck, with an unfolded lift platform in a fully raised position, according to one embodiment.

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

Embodiments of a lift gate system including a lift platform lock and release mechanism are disclosed herein. In one embodiment, a lift gate comprise a foldable lift platform including multiple sections that are rotatable relative to one another for folding and unfolding the lift platform, and a lifting mechanism for supporting and moving the lift platform, and at least one lift platform locking mechanism coupled to two adjacent sections of the lift platform to lock and unlock said two adjacent sections together. The locking mechanism includes a locked position whereby the locking mechanism restricts rotation of said two adjacent sections relative to one another.

In one embodiment, the locking mechanism comprises a main body coupled to a first of said two adjacent sections and a bolt holder coupled to a second of said two adjacent sections, wherein the main body slidably maintains at least a mid portion of an elongated bolt. In the locked position, an end portion of the bolt is maintained by the bolt holder, thereby restricting rotation of said two adjacent sections relative to one another.

In one embodiment, the main body comprises a housing having spaced opposing end walls, each end wall having an opening for slidably receiving the bolt, and a bolt lever transversely fixed to a portion of the bolt for sliding the bolt within the housing between the end walls.

In one embodiment, the bolt lever protrudes from an elongated opening in the housing, the elongated opening having a retaining structure at an end thereof for releasably engaging the bolt lever in a locked position of the lift platform locking mechanism. In one embodiment, the main body further includes a biasing member for urging the bolt handle against the retaining structure in the locked position of the locking mechanism.

In one embodiment, the lift platform locking mechanism further includes an unlocked position. The bolt lever protrudes from an elongated opening in the housing, the elongated opening having a first retaining structure and a second retaining structure at opposing ends thereof, for releasably engaging the bolt lever in locked and unlocked positions of the lift platform locking mechanism, respectively.

In one embodiment, the main body further includes a first biasing member for urging the bolt handle against the first retaining structure in the locked position of the locking mechanism, and a second biasing member for urging the bolt handle against the second retaining structure in the unlocked position of the locking mechanism.

In another embodiment, a lift platform locking mechanism for coupling to a lift platform of a lift gate is provided wherein the lift platform having multiple sections that are rotatable relative to one another for folding and unfolding the lift platform. The lift platform locking mechanism comprises a main body, an elongated bolt, the main body slidably maintaining at least a mid portion of the elongated bolt, and a bolt holder for slidably receiving a portion of the elongated bolt. The lift platform locking mechanism is configured for coupling to two adjacent sections of the lift platform to lock and unlock said two adjacent sections together.

The main body is configured for coupling to a first of said two adjacent sections, and the bolt holder is configured for coupling to a second of said two adjacent sections. Wherein the locking mechanism has a locked position, such that when the lift platform locking mechanism is in the locked position, an end portion of the bolt is engaged by the bolt holder, thereby restricting rotation of said two adjacent sections relative to one another. When the lift platform locking mechanism is not in the locked position, the bolt is disengaged from the bolt holder, thereby allowing rotation of said two adjacent sections relative to one another. When the lift platform locking mechanism is not in the locked position, then the lift platform locking mechanism can be either in a neutral position or an unlocked position.

In one embodiment, the elongated bolt is slidable within the main body, such that in the locked position, an end portion of the bolt is maintained within an opening in the bolt holder, thereby restricting rotation of said two adjacent sections relative to one another.

In one embodiment, the main body comprises a housing having opposing end walls, each end wall having an opening for slidably receiving the bolt, such that a mid portion of the bolt is maintained in the housing between said opposing end walls.

In one embodiment, the main body further comprises a bolt lever transversely fixed to a mid portion of the bolt maintained in the housing between said opposing end walls, for sliding the bolt within the housing between said end walls.

In one embodiment, the bolt lever protrudes from an elongated opening in the housing, the elongated opening having a first retaining structure and a second retaining structure at opposing ends thereof.

In one embodiment, the first retaining structure is configured for releasably engaging and maintaining the bolt lever in the locked position of the lift platform locking mechanism, and the second retaining structure is configured for releasably engaging and maintaining the bolt lever in an unlocked position of the lift platform locking mechanism.

In one embodiment, the main body further includes a first biasing member for urging the bolt handle against the first retaining structure in the locked position of the locking mechanism, wherein the first biasing member is maintained between the bolt handle and a first end wall of the housing. The main body further includes a second biasing member for urging the bolt handle against the second retaining structure in the unlocked position of the locking mechanism, wherein the second biasing member is maintained between the bolt handle and a second end wall of the housing.

In one embodiment, to release the bolt handle from the first retaining structure, the bolt handle is manually urged against the first biasing member and rotated away from the first retaining structure to disengage the bolt handle from the first retaining structure, such that upon disengagement of the bolt handle from the first retaining structure the first biasing member urges the bolt handle to slide the bolt to a neutral position in the main body. To release the bolt handle from the second retaining structure, the bolt handle is manually urged against the second biasing member and rotated away from the second retaining structure to disengage the bolt handle from the second retaining structure, such that upon disengagement of the bolt handle from the second retaining structure the second biasing member urges the bolt handle to slide the bolt to a neutral position in the main body, between the locked and unlocked positions.

FIG. 1 shows a perspective view of a lift gate system with a foldable lift platform mounted at the rear of a freight vehicle or truck, with an unfolded lift platform in a fully raised position, according to one embodiment.

Referring to FIG. 1, an example vehicle 1 such as a truck with a rear opening, wherein a lift gate system with platform lock and release mechanisms, according to one embodiment is installed thereon. In one embodiment, the lift gate system comprises a load elevator in the form of a lift gate 10 that provides a dual lift system including a parallel pair of vertically extending columns 11, each having a vertically disposed hydraulic cylinder for vertically raising and lowering a load carried by the pair of cylinders.

The lift gate 10 includes a rigid H-frame having said parallel pair of upstanding columns 11. The columns 11 contain a corresponding pair of vertically disposed hydraulic cylinders having runners interconnected by a transverse stabilizing bar typically supporting a multiple-section foldable lifting/lift platform 12 actuated on each side by an actuating linkage system.

The lift platform 12 is supported between left and right support columns 11 which include actuators for lowering/raising the lift platform 12. The lift gate 10 allows lifting payloads on the lift platform 12 from one level (e.g., ground level) up to another level (e.g., the bed 2 of the vehicle), or vice versa.

Figure 10:
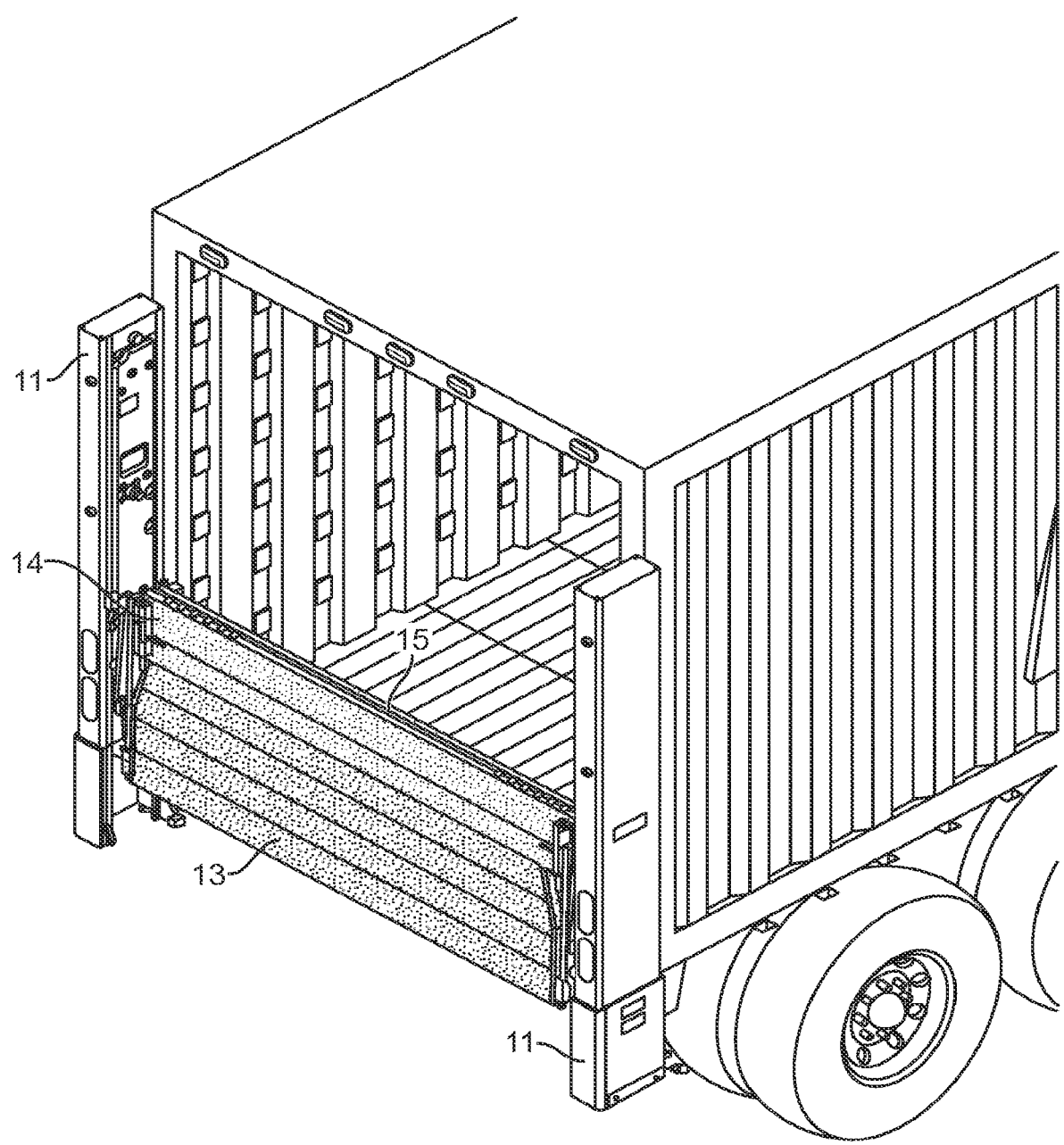
FIG. 10 shows a perspective view of the lift gate system of FIG. 1, with the lift platform in fully folded position and the platform lock and release mechanism unlocked.

As shown in FIG. 1, the foldable lift platform 12 includes three hinged planar rectangular sections 13, 14 and 15, illustrated in unfolded position for lowering/raising loads. The lift platform sections 13, 14 and 15 can be folded in relation to each other as shown in FIG. 10, when the lift gate is not used for lowering/raising loads. When the platform 12 is unfolded, section 13 is adjacent to section 14, and section 14 is adjacent to section 15, such that section 14 is disposed between sections 13 and 15.

Figure 1A:
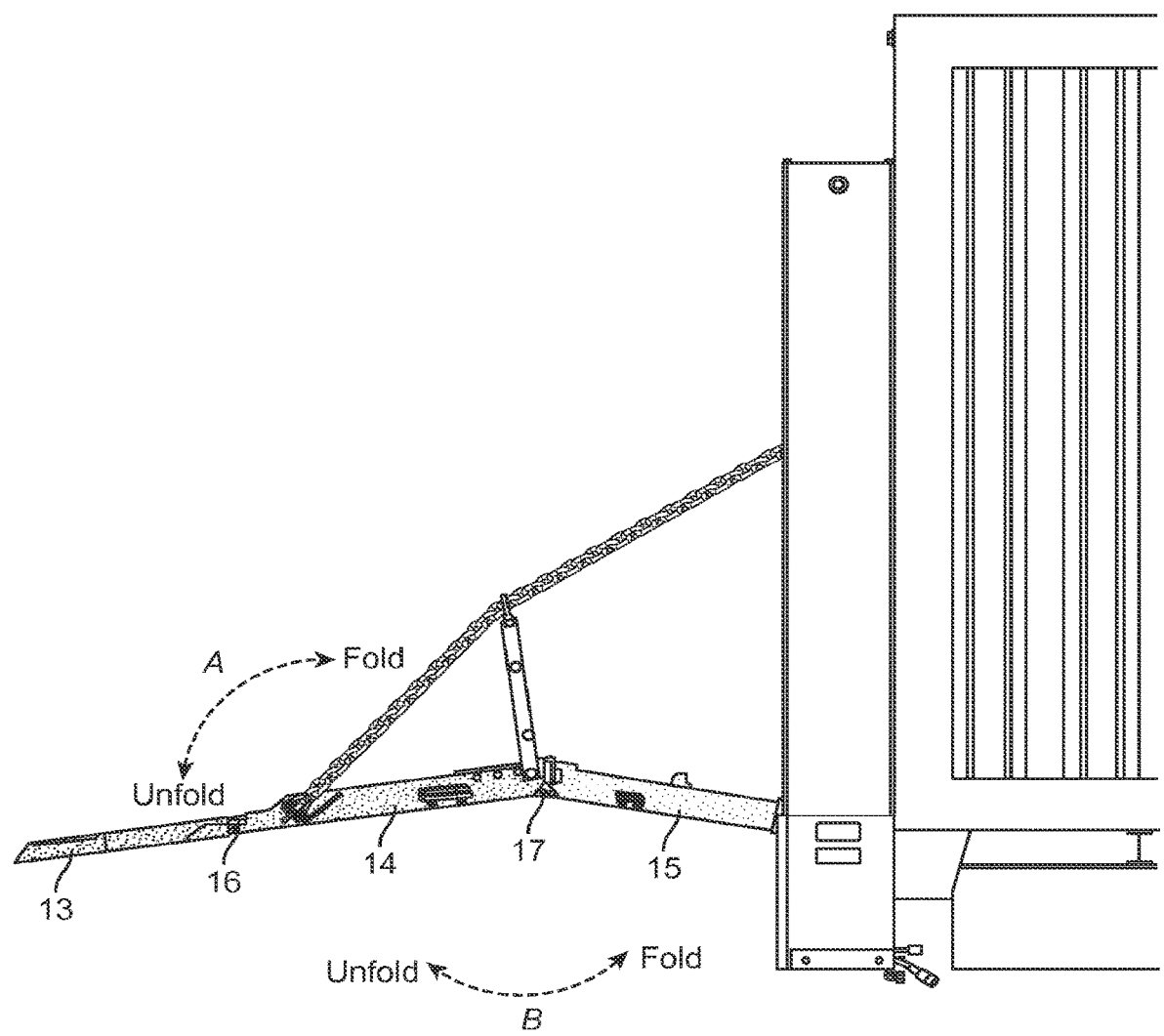
FIG. 1A shows a side view of the lift gate system of FIG. 1, with two sections of the lift platform partially rotated.

FIG. 1A shows a side view of the lift gate system of FIG. 1, with two sections of the lift platform partially folded. Referring to FIG. 1A, to fold the lift platform 12, in one example, section 13 folds over section 14 in a clockwise rotation, and section 14 folds under section 15 in a counterclockwise rotation, as an observer faces the drawing.

Referring to FIG. 1A, unfolding the lift platform 12 involves rotating section 13 away from section 14 in a counterclockwise rotation (as shown by dashed arrow A) pivoting on a hinge mechanism 16 which then maintains sections 13 and 14 in the same plane in relation to each other. The hinge mechanism 16 only allows a maximum 180 degree rotation of the section 13 relative to section 14.

Unfolding the lift platform 12 further involves rotating section 14 away from section 15 in a clockwise rotation (as shown by dashed arrow B) pivoting on a hinge mechanism 17 which then maintains sections 14 and 15 in the same plane in relation to each other in counterclockwise direction. In one example, the hinge mechanism 16 only allows a maximum 180 degree rotation of the section 13 relative to section 14 in clockwise direction (opposite direction of unfolding platform section 13 from section 14).

Embodiments of the lift gate 10 further include a platform lock and release system comprising at least one lock and release mechanism 20. In one embodiment, each lock and release mechanism 20 has a locked position (e.g., FIGS. 8 and 17). When the lock and release mechanism 20 is not in the locked position, then the lock and release mechanism 20 can be either in a neutral position (e.g., FIGS. 5 and 20), or the lock and release mechanism 20 can be in a unlocked position (FIGS. 7 and 13), a locked position (e.g., FIGS. 8 and 17), as described further hereinbelow.

Each platform lock and release mechanism 20 allows a lift gate operator to manually lock and unlock the platform sections 14 and 15 together, wherein when the unfolded platform sections 14 and 15 are locked together via the mechanism 20, the mechanism 20 prevents buckling (i.e., rotation) of the platform sections relative to one another when the lift platform 12 is in its unfolded position and load is placed thereon.

When in a locked position, the mechanism 20 maintains the unfolded platform sections 14 and 15 in essentially the same plane by restricting rotation of the platform sections 14 and 15 relative to one another, such that the unfolded platform sections 14 and 15 together provide an essentially level surface, even when a load is placed on the platform 12.

When in the unlocked position, the mechanism 20 allows the platform sections 14 and 15 to freely rotate relative to each other. Further, when in a neutral position (between locked and unlocked positions), the mechanism 20 does not restrict platform sections 14 and 15 from freely rotating relative to one another other.

Figure 2:
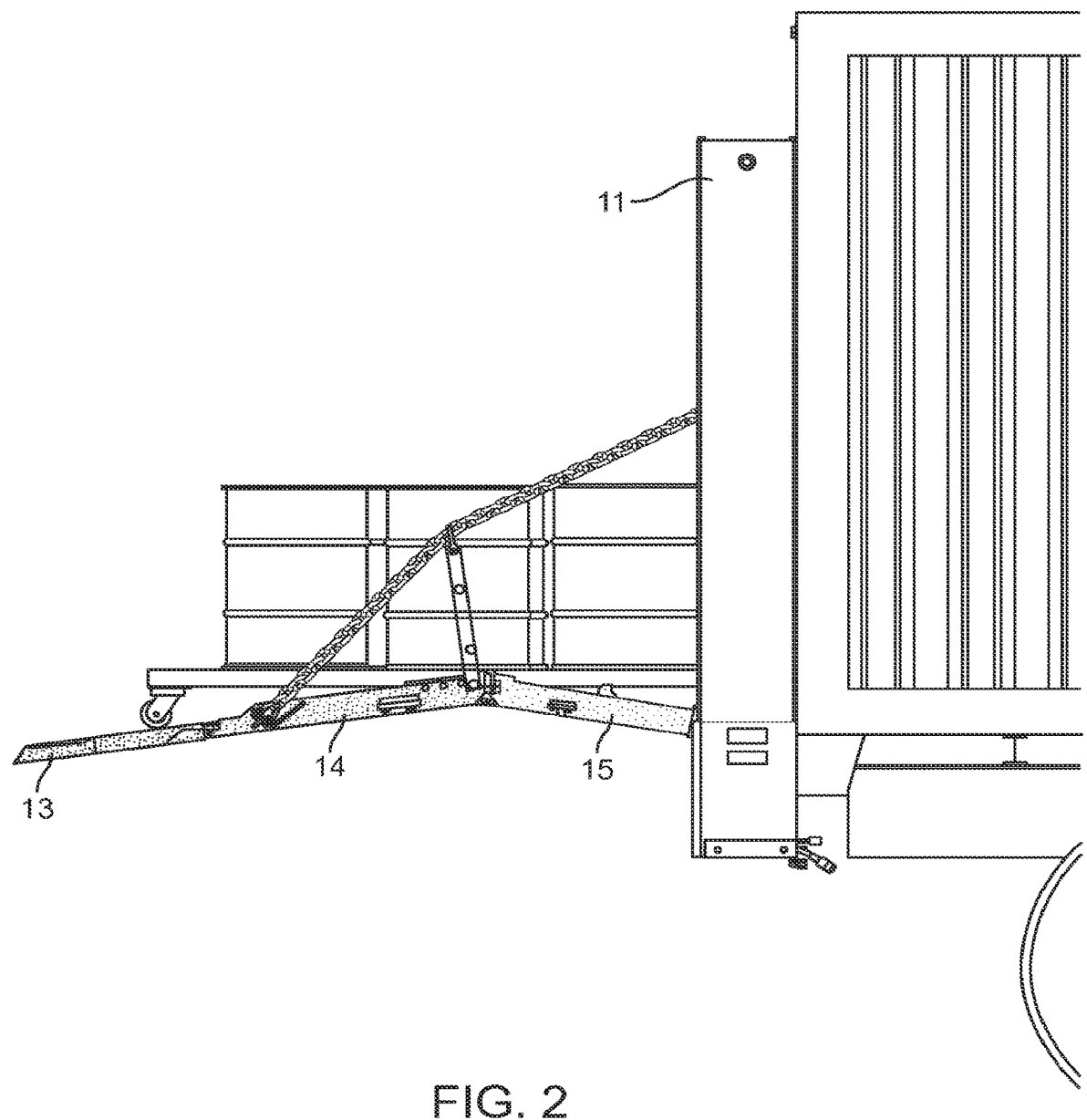
FIG. 2 shows the lift gate system of FIG. 1A, with a load on a cart crossing over lift platform sections.
Figure 3:
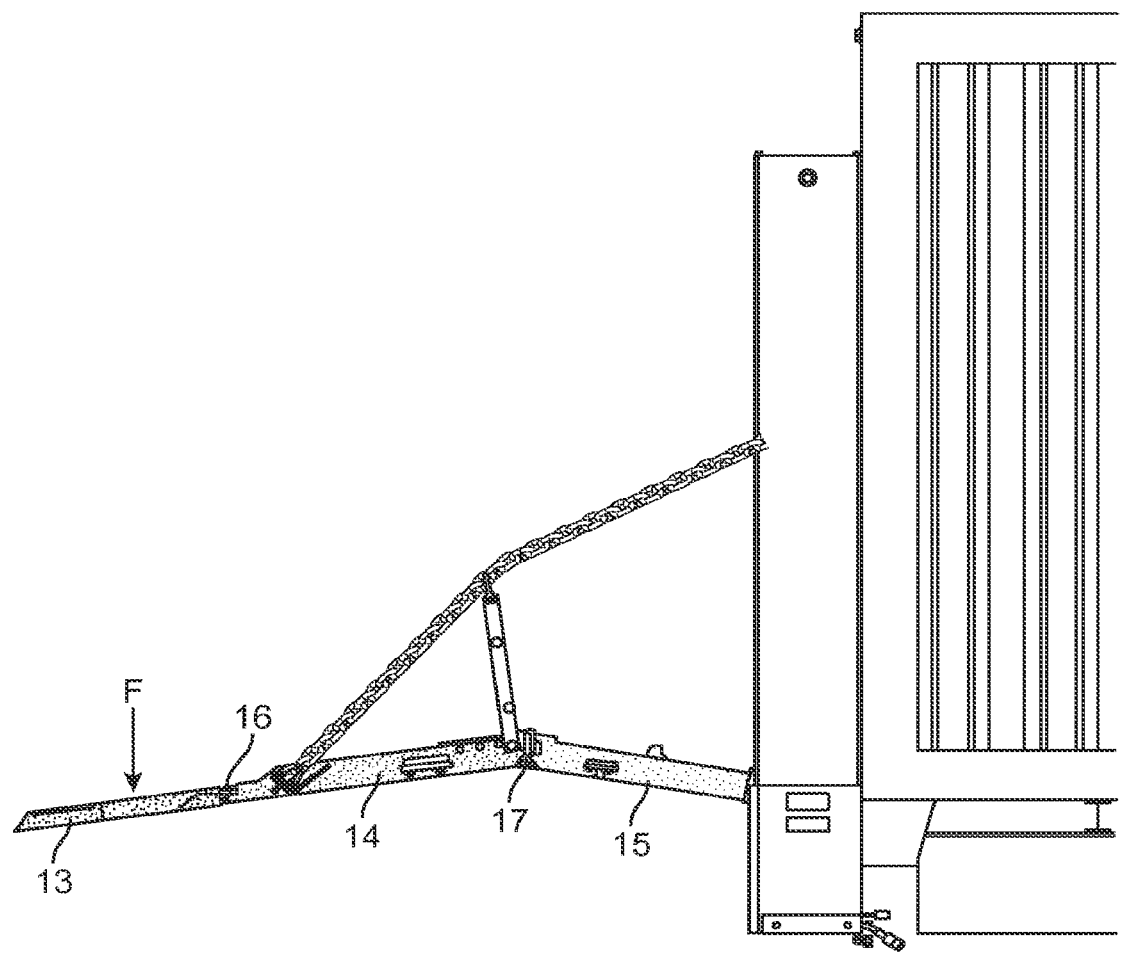
FIG. 3 shows the lift gate system of FIG. 2, illustrating application of a force F on a section of the foldable lift platform due to a load, with platform lock and release mechanism in an unlocked position.

FIG. 2 shows the lift gate system of FIG. 1A with a load on a cart crossing over lift platform sections, and the platform lock and release mechanism in an unlocked position. FIG. 3 shows the lift gate system of FIG. 2, illustrating application of a force F on a section of the foldable lift platform due to the load cart (not shown in FIG. 2). Without a lift platform lock and release mechanism, when the lift platform 12 is in the unfolded position, application of the force F on section 13 by load objects causes the sections 14 and 15 to buckle (rotate counterclockwise) towards a folding position, which is undesirable.

By contrast, according to embodiments disclosed herein, a lift platform 12 with a lock and release mechanism 20 that is operated in a locked position (as described in more detail hereinbelow), allows an operator to lock the platform sections 14 and 15 together to prevent such buckling. The lock and release mechanism 20 further allows simple operation of locking the sections 14 and 15 together when the lift platform 12 is unfolded to be used for lowering/raising cargo thereon. The lock and release mechanism 20 further allows simple operation of unlocking the sections 14 and 15 from each other to fold the lift platform 12.

Figure 4:
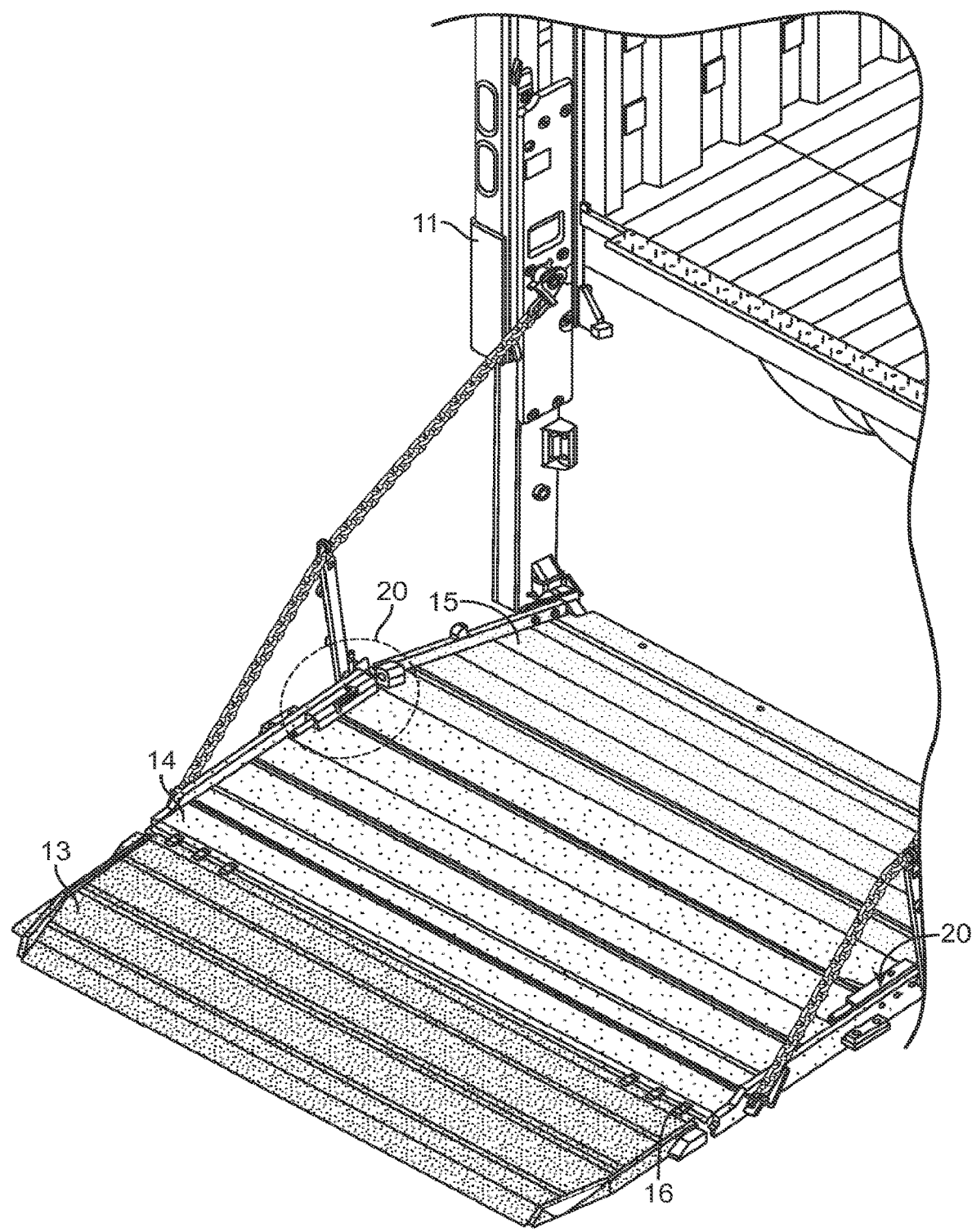
FIG. 4 shows a perspective view of the lift gate system in FIG. 1, illustrating a platform lock and release mechanism on the foldable lift platform with the platform lock and release mechanism in an unlocked position, according to an embodiment.

FIG. 4 shows a more detailed partial perspective view of the lift gate system in FIG. 1, illustrating an embodiment of a platform lock and release mechanism 20 (in unlocked position) on the foldable lift platform 12, according to an embodiment, wherein the lift platform 12 is unfolded.

Figure 5:
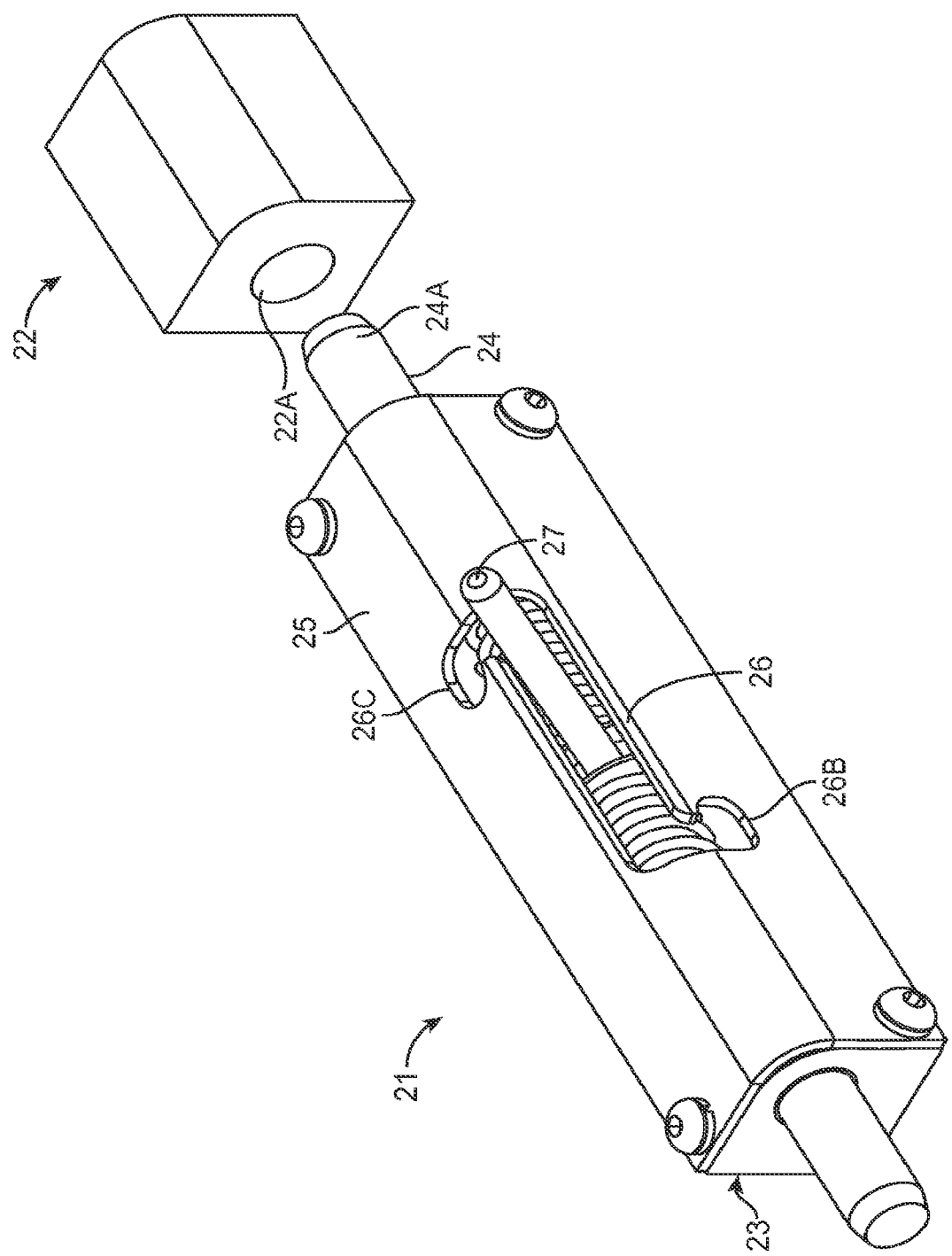
FIG. 5 shows a perspective view of the platform lock and release mechanism apart from the lift platform, in a neutral position of the lock and release mechanism, according to an embodiment.
Figure 6:
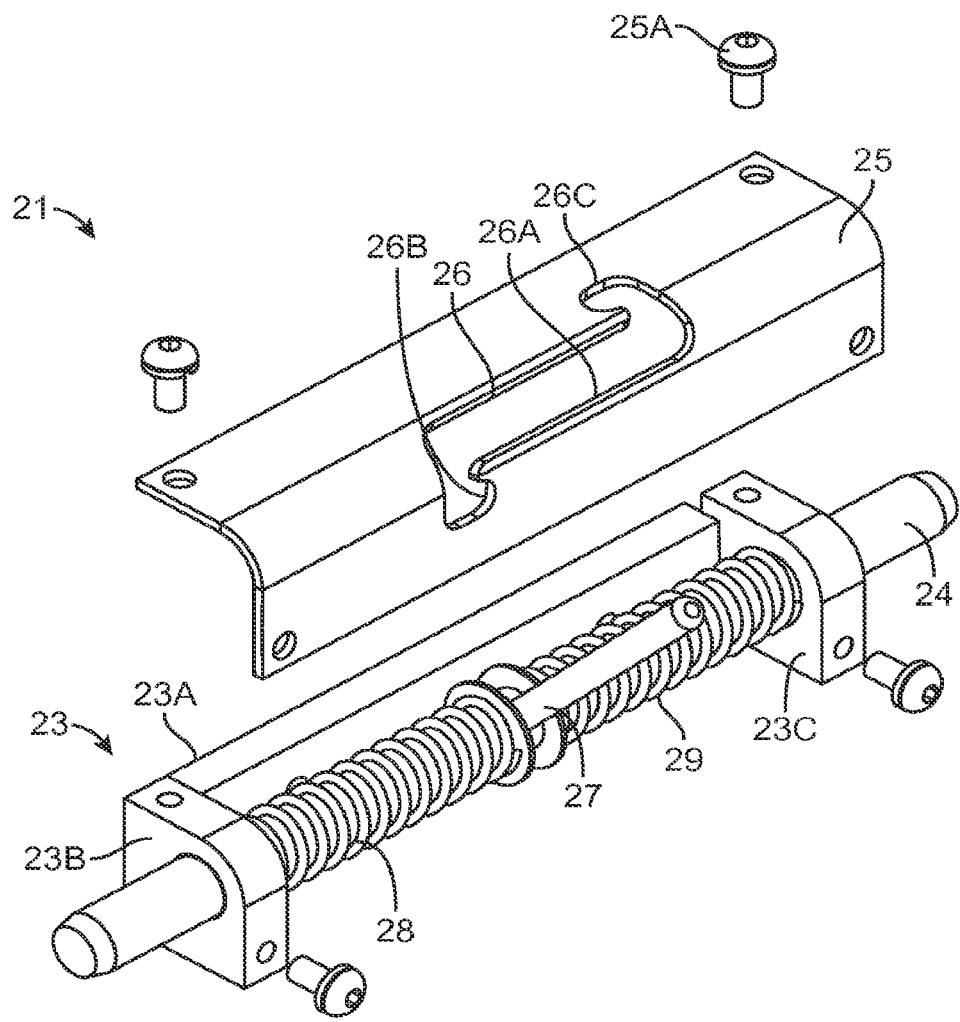
FIG. 6 shows an exploded perspective view of the platform lock and release mechanism of FIG. 5, according to an embodiment.

FIG. 5 shows a perspective view of the platform lock and release mechanism 20 apart from the lift platform 12, in a neutral position of the lock and release mechanism, according to an embodiment. FIG. 6 shows an exploded (partially disassembled) perspective view of the platform lock and release mechanism 20 of FIG. 5, showing components thereof.

Referring to FIGS. 5 and 6, the mechanism 20 comprises a main body 21 and a bolt holder 22. In application, the main body 21 is affixed to the platform section 14 and the bolt holder 22 is affixed to the platform section 15. In another embodiment (not shown) the main body 21 can be affixed to the platform section 15 and the bolt holder 22 can be affixed to the platform section 14, in a reverse direction, as those skilled in the art will recognize.

The main body 21 includes a housing 23 forming an enclosure for slidably maintaining at least a portion of an elongated bolt 24, wherein a bolt handle or lever 27 is transversely fixed to a mid portion of the bolt 24. The bolt holder 22 has an opening 22A for receiving a tip portion 24A of the bolt 24 when the mechanism 20 is in a locked position, wherein the bolt holder 22 engages the bolt 24 (in unlocked and neutral positions, the bolt 24 is disengaged from the bolt holder 22). In coupling the main body 21 and the bolt holder 22 to section 14 and section 15, respectively, the bolt holder 22 is aligned with the main body 21 such that the opening 22A slidably receives bolt 24 when the bolt 24 is slid in the main body 21 towards the bolt holder 22, as described further below.

In one embodiment, the housing 23 is essentially U-shaped and comprises an essentially curved L-shaped profile cover 25 and back wall segment 23A. The cover 25 includes an essentially S-shaped opening 26 through which the bolt handle 27 slidably protrudes from the cover 25.

The housing 23 includes an elongated back wall segment 23A and opposing end wall segments 23B and 23C that are spaced from one another, wherein segment 23A is affixed to the cover 25 and opposing end wall segments 23B and 23C. The segments 23B and 23C include openings for slidably receiving opposing ends of the cylindrical bolt 24. The cover 25 is affixed to the housing 23 via fasteners (e.g., screws) 25A.

The main body 21 further includes one or more biasing members such as coil springs 28 and 29 that concentrically receive the bolt 24 therethrough on either side of the handle 27, as shown in FIG. 6. Spring 29 is trapped between end wall section 23C and the handle 27. Spring 28 is trapped between the end wall 23B and handle 27. Other types of biasing means besides coil springs may be used.

The opening 26 includes an essentially elongated midsection opening 26A and retaining structures 26B and 26C at opposing ends of the elongated mid-section opening 26A, respectively. In one embodiment, retaining structures 26B and 26C comprise notches or hook cut outs formed on the cover 25 at opposing ends of the elongated opening 26A.

Each retaining structure 26B and 26C is for releasably engaging and maintaining the handle 27. Retaining structure 26C is for releasably engaging and maintaining the handle 27 for the locked position of the mechanism 20, wherein the tip portion of the bolt 24 is within opening 22A of the bolt holder 22. Retaining structure 26B is for releasably engaging and maintaining the handle 27 for the unlocked position of the mechanism 20, wherein the tip portion of the bolt 24 is not within opening 22A of the bolt holder 22. As such, in unlocked and neutral positions of the mechanism, the bolt 24 is disengaged from the bolt holder 22 such that sections 14 and 15 can rotate relative to one another.

The handle 27 has three positions in the opening 26, corresponding to the neutral, locked and unlocked positions of the mechanism 20. In a neutral position shown in FIG. 5, the handle 27 is situated essentially midway between the end walls 23B and 23C, and midway between hook cut outs 26B and 26C in the opening 26 (as also shown in FIG. 21 showing section 13 folded over section 14, and section 14 unfolded from section 15). The springs 28 and 29 are equally compressed, if at all.

Figure 8:
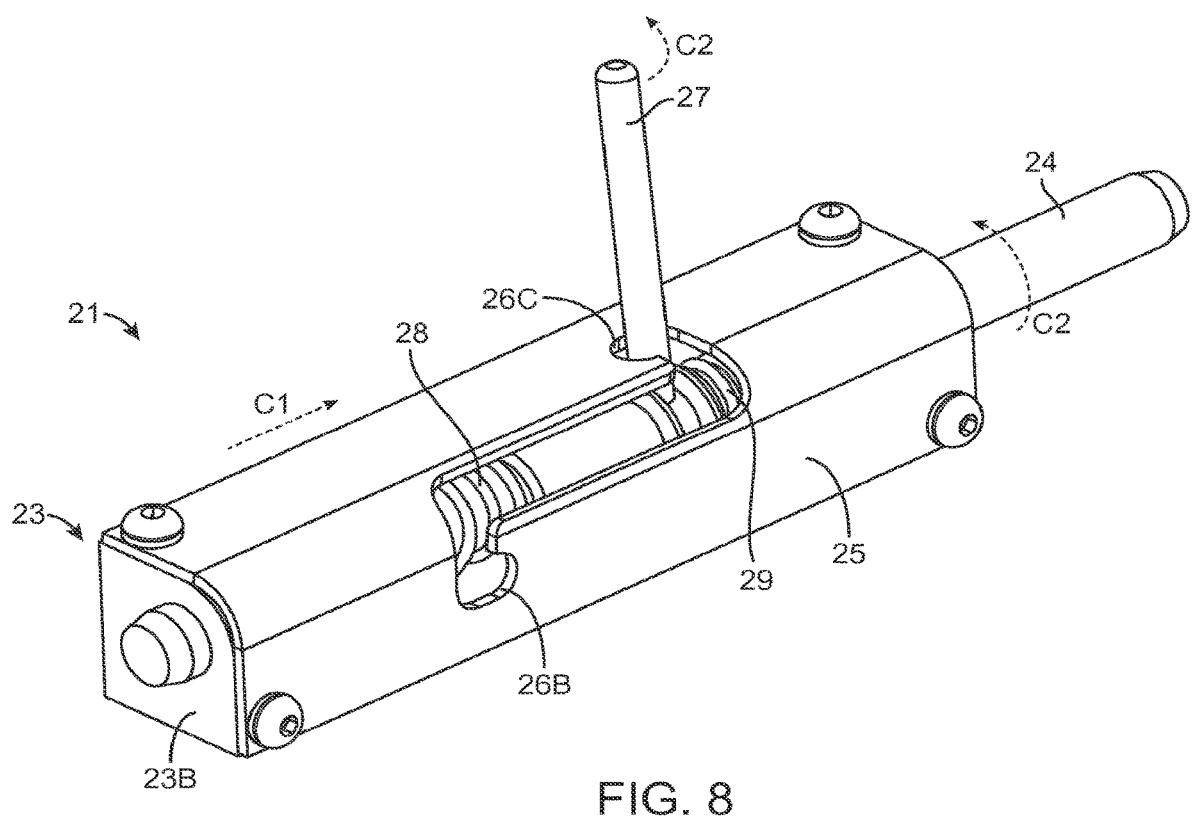
FIG. 8 shows the platform lock and release mechanism of FIG. 5 in a locked position.

In a locked position, shown in FIG. 8, the handle 27 is engaged by the hook cut out 26C while a biasing tension of the compressed spring 29 urges the handle 27 against the hook cut out 26C, wherein coil spring 29 is more compressed than coil spring 28.

Figure 7:
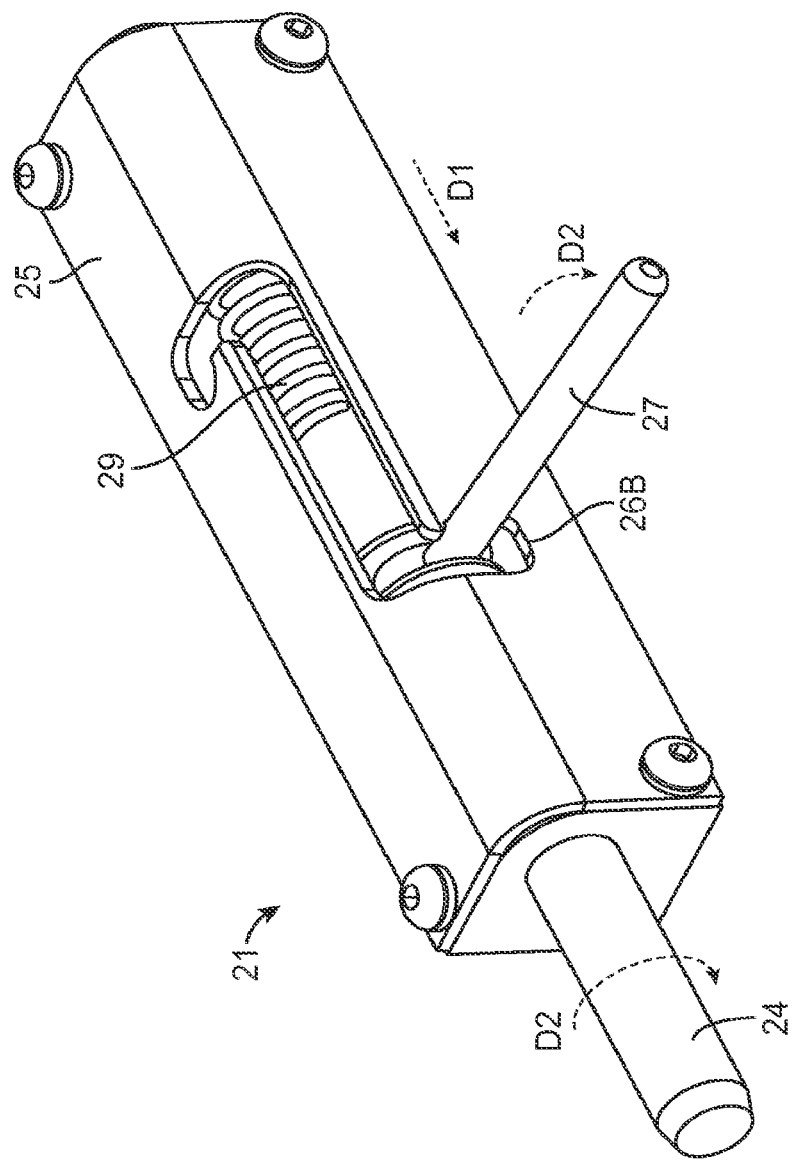
FIG. 7 shows the platform lock and release mechanism of FIG. 5 in an unlocked position.

In an unlocked position, shown in FIG. 7, the handle 27 is engaged by the hook cut out 26B while a biasing tension of the compressed spring 28 urges the handle 27 against the hook cut out 26B, wherein coil spring 28 is more compressed than coil spring 29.

As shown in the drawings, in one embodiment the mechanism 20 is mounted to the platform sections 14 and 15, wherein in a locked position, the mechanism 20 prevents or restricts rotation of the platform section 14 relative to platform section 15. In the neural position of the mechanism 20 (between locked and unlocked positions as shown in FIG. 5) the handle 27 is not engaged in the hook cut outs 26C or 26B of the cover 25. In the locked position of mechanism 20, the handle 27 is securely maintained in the hook 26C due to spring loading (urging) of compressed spring 29 on handle 27, as shown in FIG. 6.

FIG. 7 shows the platform lock and release mechanism 20 of FIG. 5 with the bolt 24 and handle 27 in an unlocking position. FIG. 8 shows the platform lock and release mechanism 20 of FIG. 5 with the bolt 24 and handle 27 in a locking position.

To place the handle 27 in a locked position from the neutral position, the handle 27 is first slid towards the end wall 23C along the long axis of the bolt 24 (along dashed arrow C1 in FIG. 8) manually by an operator, compressing spring 29. Then handle 27 is rotated (along dashed arrow C2) relative to cover 25 toward hook cut out 26C, thereby axially rotating the bolt 24, for a portion of the handle 27 to engage the hook cut out 26C.

Figure 18:
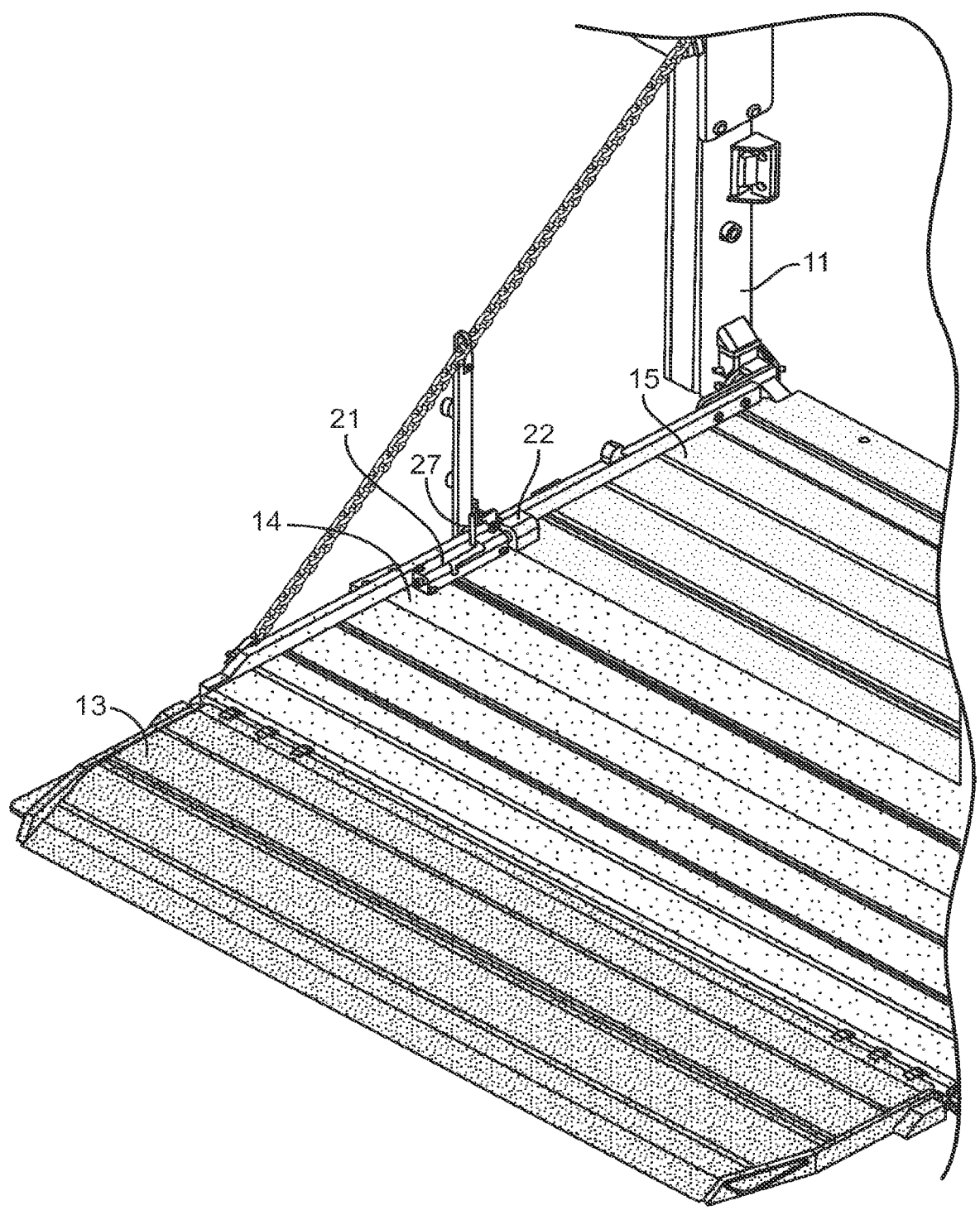
FIG. 18 shows a partial perspective view of the lift gate system of FIG. 9, with the lift platform fully lowered to ground level, and the lift platform fully unfolded, illustrating details of a locked platform lock and release mechanism on a left side of the lift platform.

Placing the handle 27 in the locked position as shown in FIG. 8, causes the bolt 24 to further extend out of the housing 23 and tip portion 24A enter into the corresponding opening 22A of the bolt holder 22 affixed to the platform section 15, as also shown in FIG. 18.

In the locked position of handle 27, the mechanism 20 prevents rotation of the platform section 14 relative to platform section 15 even if a load is placed on e.g., the platform section 14. In the locked position of the mechanism 20, the handle 27 is trapped in the hook cut out 26C with the spring 29 under compression between the end wall 23C and handle 27 to maintain the handle 27 in the hook cut out 26C.

As such, the tip end portion 24A of the bolt 24 is securely maintained within the opening 22A of the bolt holder 22. In this position, the rigid bolt 24 is securely maintained within the rigid main body 21 at one end, and within the rigid bolt holder 22 at an opposing end, and restricts (e.g., prevents) rotation of the sections 14 and 15 relative to one another.

To release the handle 27 from hook 26C, the handle 27 is manually moved out of the hook 26C and then rotated down by an operator (in opposite direction of dashed arrow C2), placing the handle 27 in the elongated mid-section opening 26A of the opening 26. The spring 29 is allowed to decompress and slide the bolt 24 back to neural position with handle 27 travelling along elongated mid-section 26A of the opening 26 between hooks 26B and 26C (opposite direction of dashed arrow C1). In the neutral position, the tip portion 24A of the bolt 24 is retracted out of the corresponding opening 22A of the bolt holder 22.

As shown in FIG. 7, to place the handle 27 in an unlocked position from the neutral position, the handle 27 is slid towards the end wall 23B (along dashed arrow D1) by an operator, compressing spring 28. Then, handle 27 is rotated (along dashed arrow D2) relative to cover 25, axially rotating the bolt 24, whereby a portion of the handle 27 engages the cut out hook 26B. In the unlocked position of mechanism 20, the handle 27 is securely maintained in hook 26B due to spring loading of compressed spring 28 on handle 27.

Figure 19:
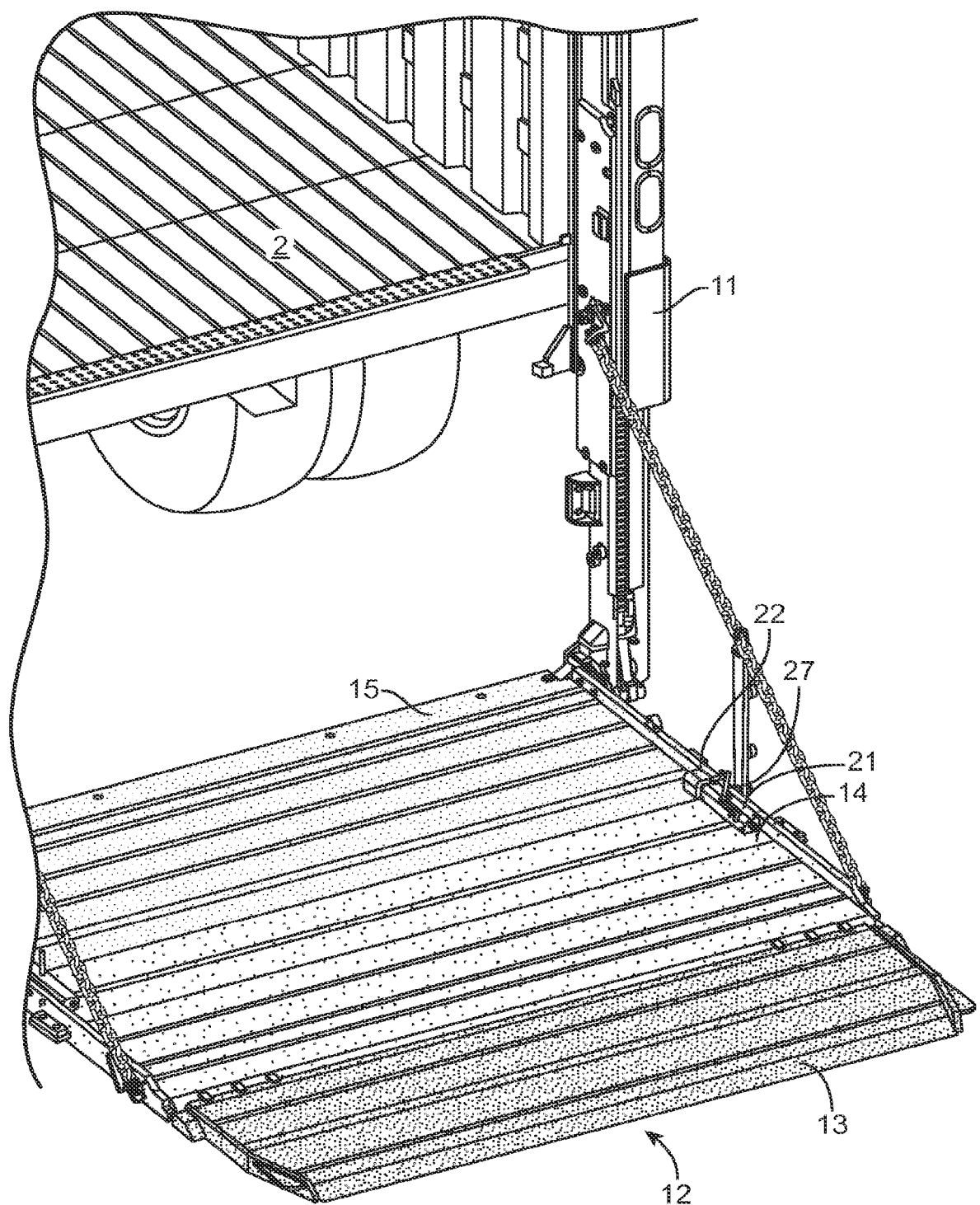
FIG. 19 shows a partial perspective view of the lift gate system of FIG. 9, with the lift platform fully lowered to ground level, and the lift platform fully unfolded, illustrating details of a locked platform lock and release mechanism on a right side of the lift platform.

Placing the handle 27 in the unlocked position keeps the tip portion 24A bolt 24 fully retracted out of the corresponding opening 22A of the bolt holder 22, wherein the mechanism 20 allows free rotation of the platform section 14 relative to platform section 15. This is also shown in FIGS. 19 and 22, which illustrate platform section 13 folded over section 14, and platform section 14 unfolded from section 15.

In the unlocked position, the handle 27 is trapped in the hook cut out 26B with the spring 28 under compression between the end wall 23B and handle 27 to maintain the handle 27 in the hook cut out 26B. To release the handle 27 from hook 26B, a similar action is performed on the handle 27 as in releasing it from hook 26C above, but in the opposite direction.

Figure 9:
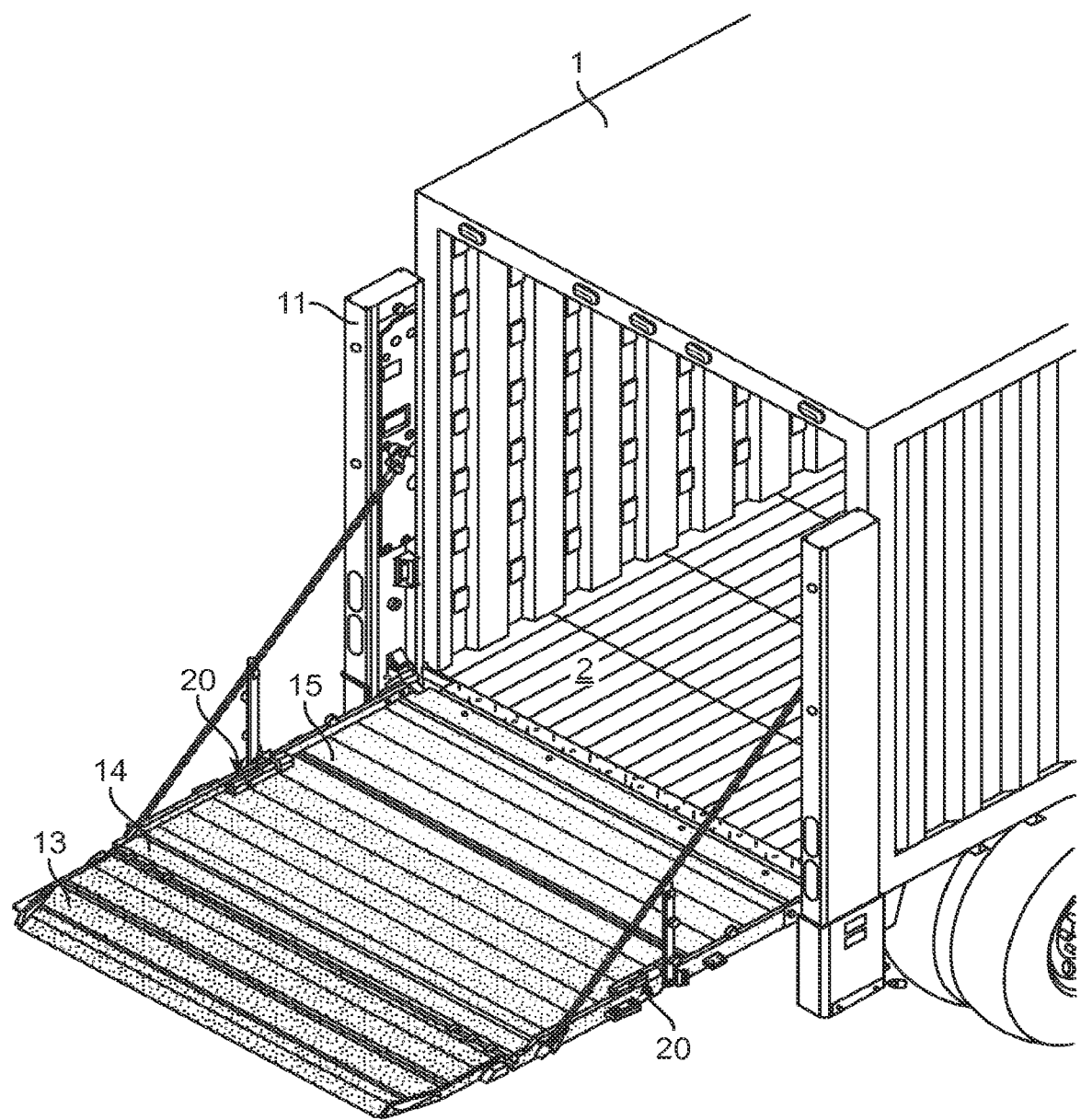
FIG. 9 shows another perspective of the lift gate system of FIG. 1, according to an embodiment.
Figure 11:
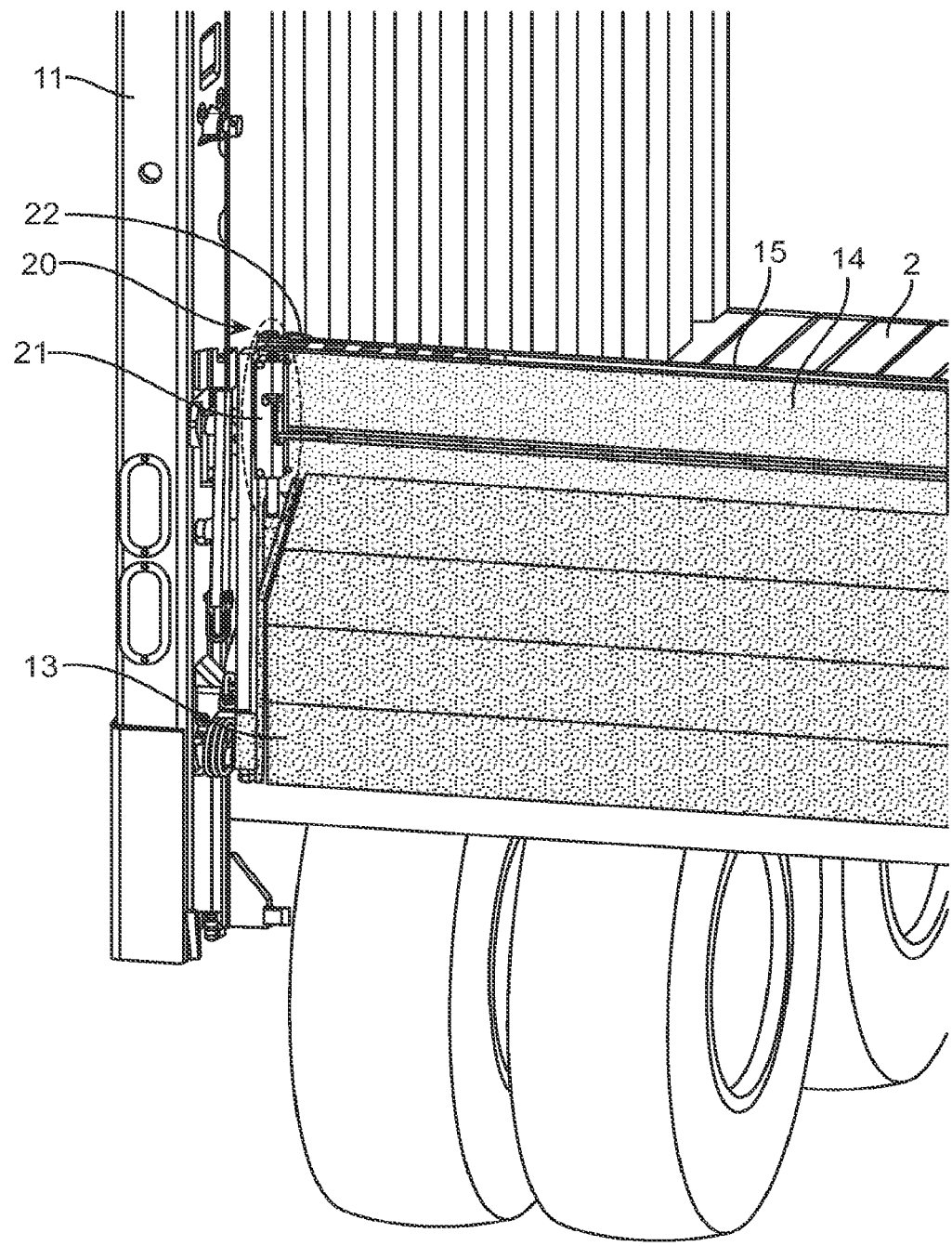
FIG. 11 shows a partial perspective view of the lift gate of FIG. 10, illustrating details of an unlocked platform lock and release mechanism on a left side of the lift platform.
Figure 12:
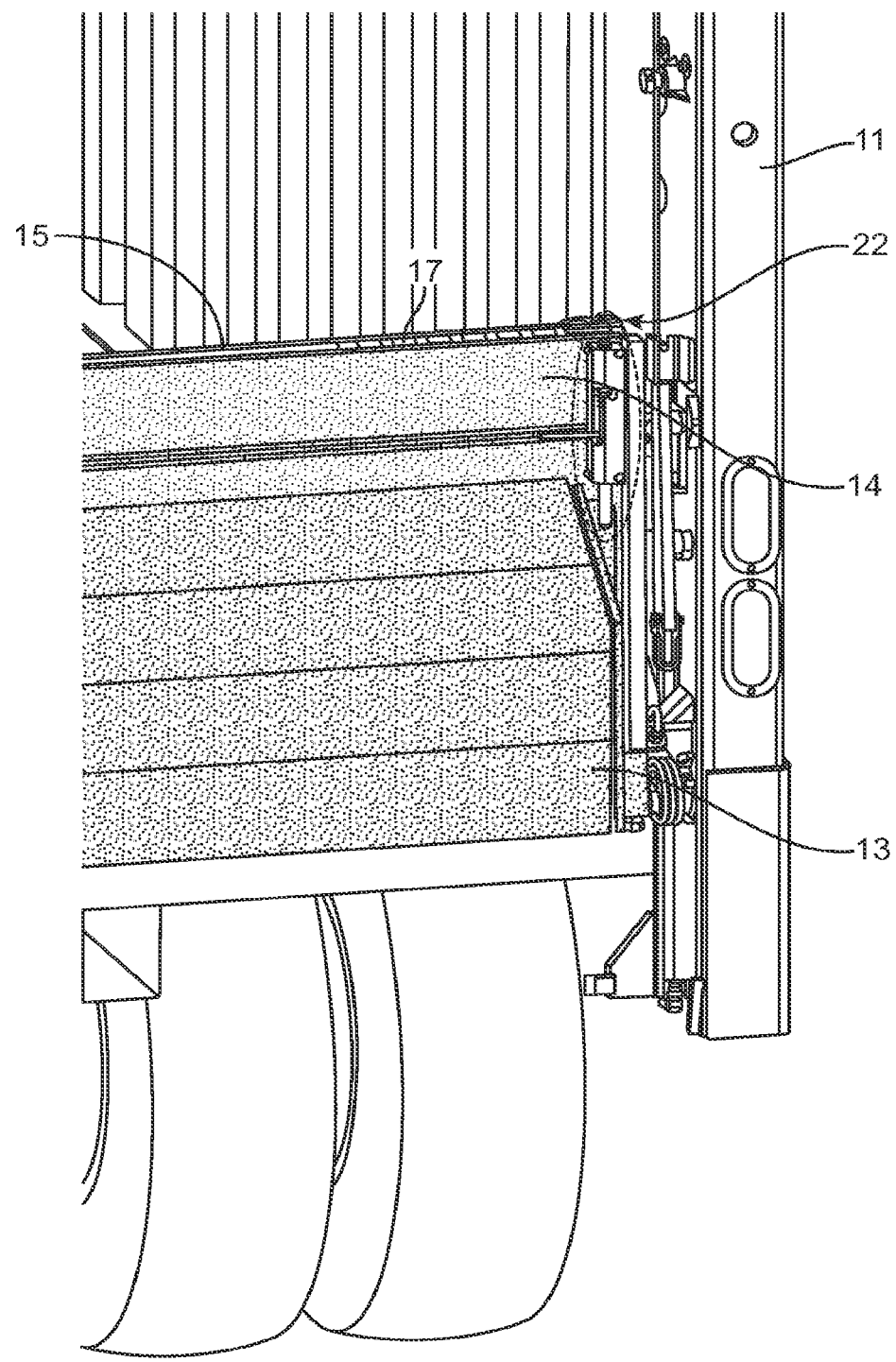
FIG. 12 shows a partial perspective view of the lift gate system of FIG. 10, illustrating details of an unlocked platform lock and release mechanism on a right side of the lift platform.

FIG. 9 illustrates the platform 12 unfolded completely and at the level of the vehicle bed 2, and mechanism 20 in the locked position. According to embodiments, a pair of mechanisms 20 can be mounted proximate the left and right edges of the platform sections 14 and 15, as shown by example in FIG. 9. Further, FIG. 10 shows a perspective view of the lift gate of FIG. 1, with the lift platform 12 in fully folded position and the platform lock and release mechanism 20 unlocked. FIG. 11 shows a more detailed view of the mechanism 20 on the left side of the lift gate of FIG. 10. Further, FIG. 12 shows a more detailed view of the mechanism 20 on the right side of the lift gate of FIG. 10.

Specifically, FIG. 11 shows a partial perspective view of the lift gate of FIG. 10, illustrating details of an unlocked platform lock and release mechanism 20 on a left side of the lift platform, wherein the lift platform 12 is completely folded and raised up against the back of the vehicle. Similarly, FIG. 12 shows a partial perspective view of the lift gate of FIG. 10, illustrating details of an unlocked platform lock and release mechanism 20 on a right side of the lift platform.

Figure 13:
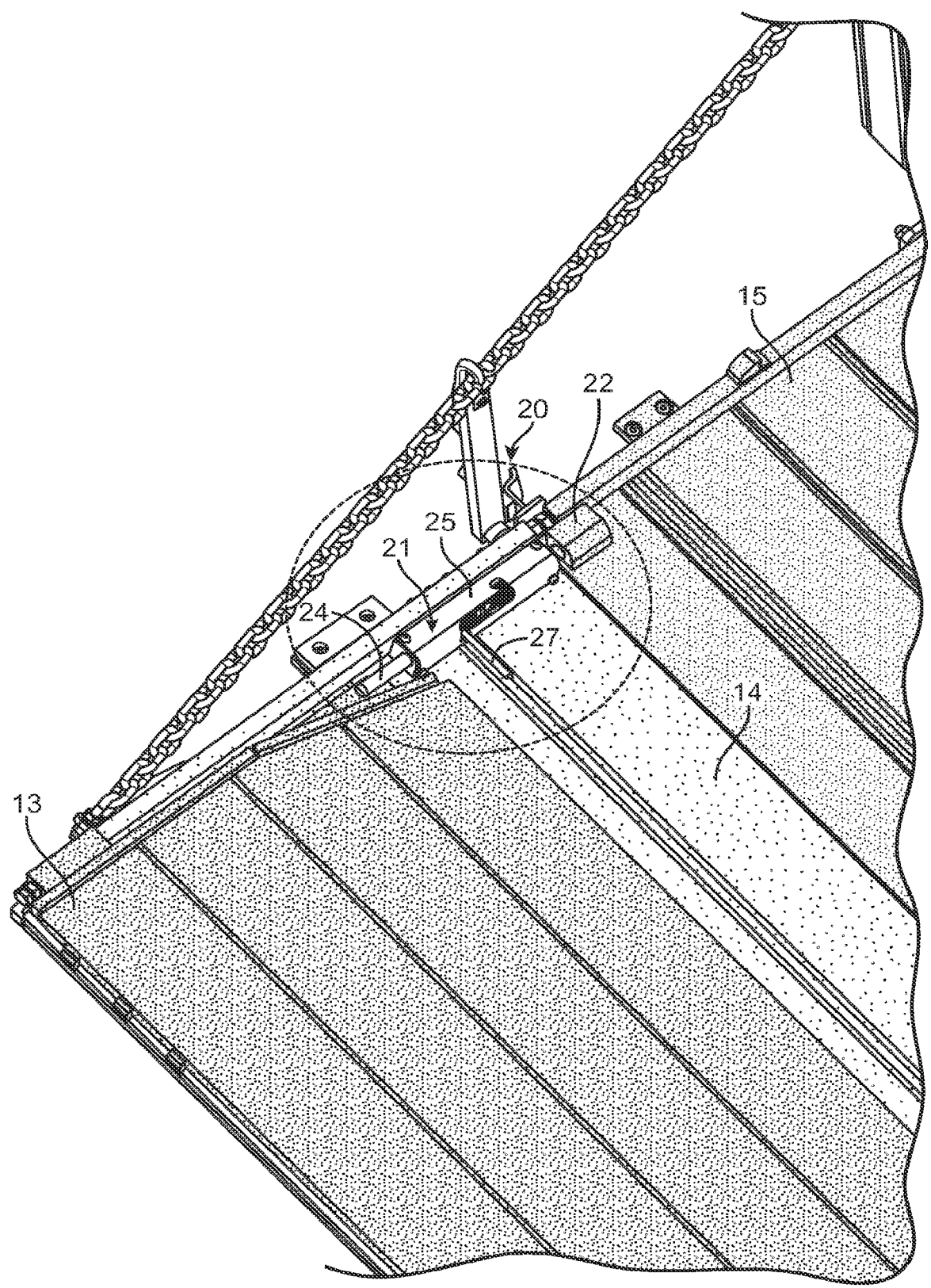
FIG. 13 shows a partial perspective view of the lift gate system of FIG. 9, with the lift platform fully lowered to ground level, and a front most section of the lift platform folded, illustrating details of an unlocked platform lock and release mechanism on a left side of the lift platform.
Figure 14:
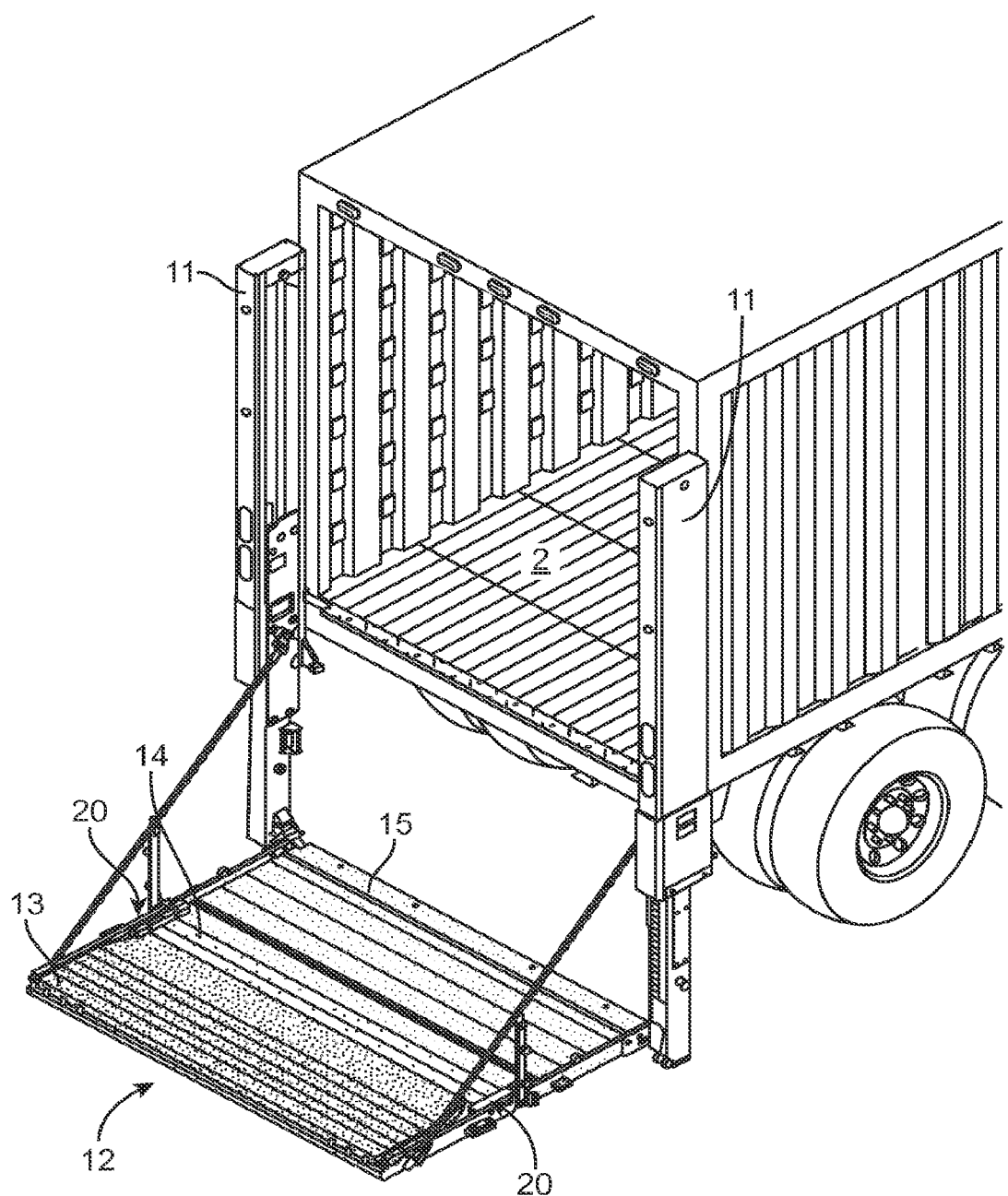
FIG. 14 shows a perspective view of the lift gate system of FIG. 13, with a front most section of the lift platform folded, illustrating details of an unlocked platform lock and release mechanisms on the left and right side of the lift platform.
Figure 15:
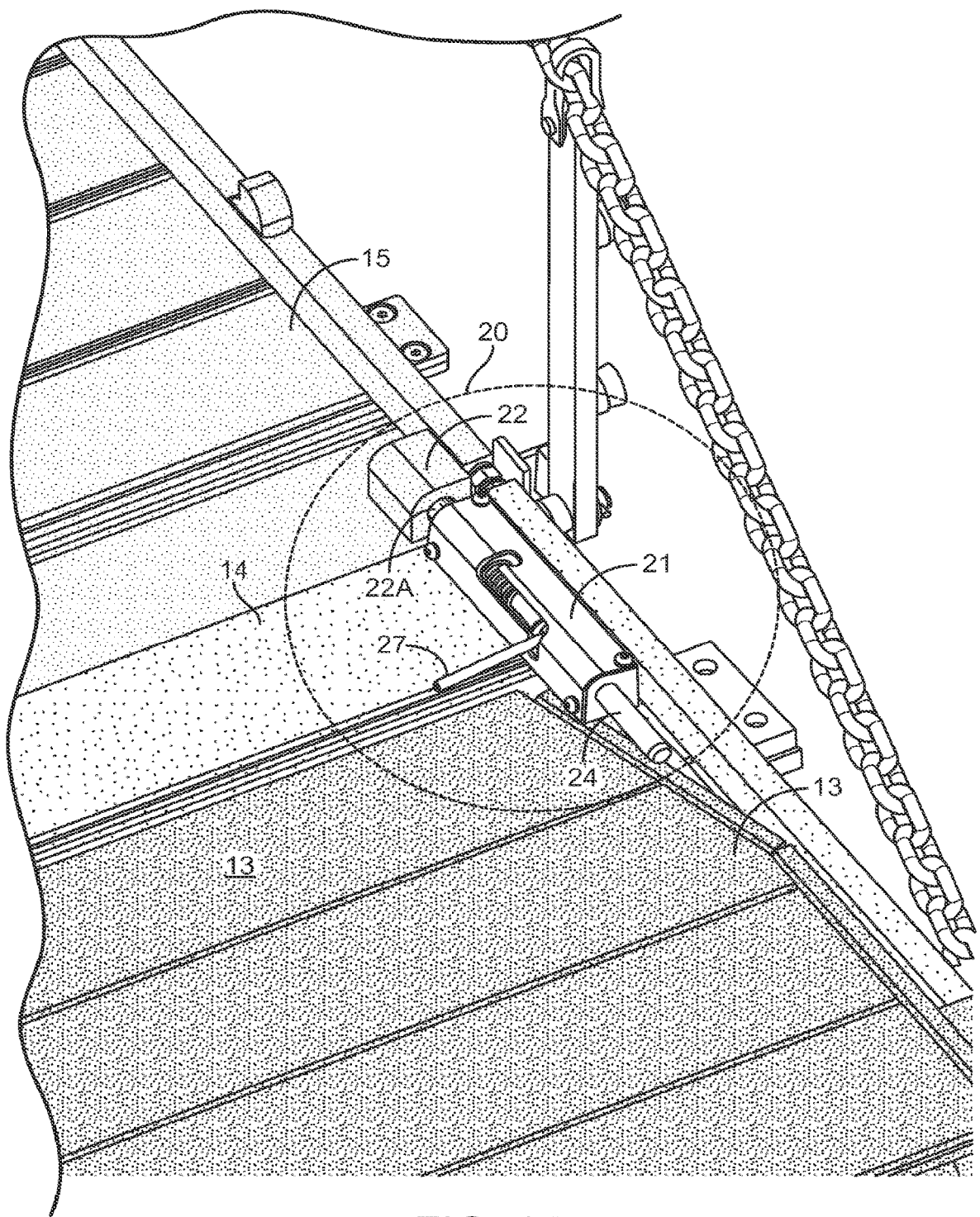
FIG. 15 shows a partial perspective view of the lift gate system of FIG. 9, with the lift platform fully lowered to ground level, and a front most section of the lift platform folded, illustrating details of an unlocked platform lock and release mechanism on a right side of the lift platform.

FIG. 14 illustrates the platform 12 with the lift platform fully lowered to ground level, and a front most section 13 of the lift platform folded over section 14. Sections 14 and 15 are unfolded and the mechanisms 20 are not in the locked position. The platform 12 is shown resting on the ground level. FIG. 13 shows a mechanism 20 in unlocked position on the left side of the lift platform 12, with the lift platform fully lowered to ground level, and a front most section 13 of the lift platform folded over section 14. Further, FIG. 15 shows a mechanism 20 in unlocked position on the right side of the lift platform 12, similar to FIG. 13.

Figure 16:
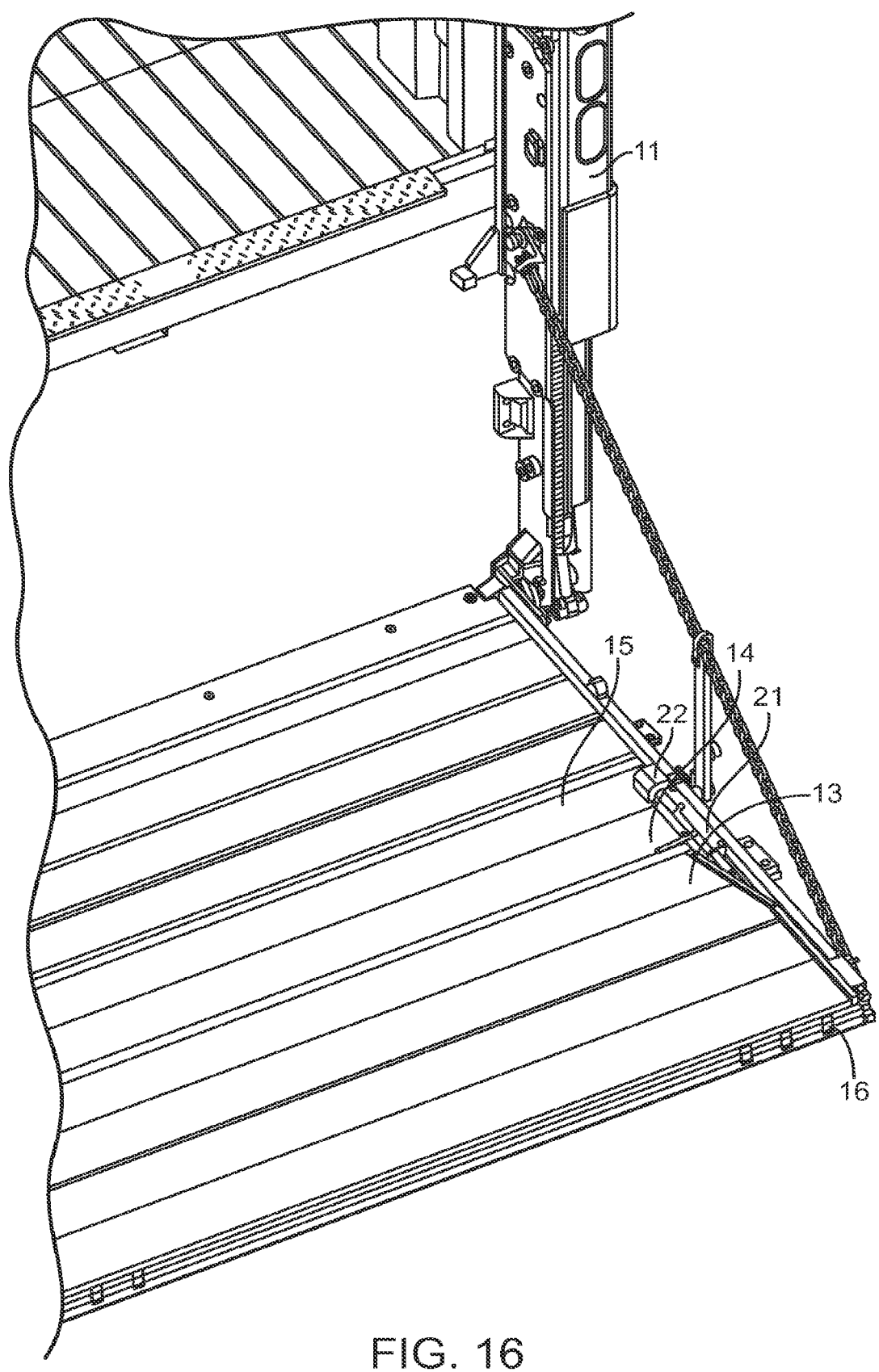
FIG. 16 shows a further partial perspective view of the lift gate system of FIG. 15, with the lift platform fully lowered to ground level, and a front most section of the lift platform folded, illustrating details of an unlocked platform lock and release mechanism on a right side of the lift platform.

FIG. 16 illustrates the platform 12 partially unfolded (i.e., section 14 unfolded from under section 15, while section 13 remains folded over section 14), and mechanism 20 in the unlocked position.

Figure 17:
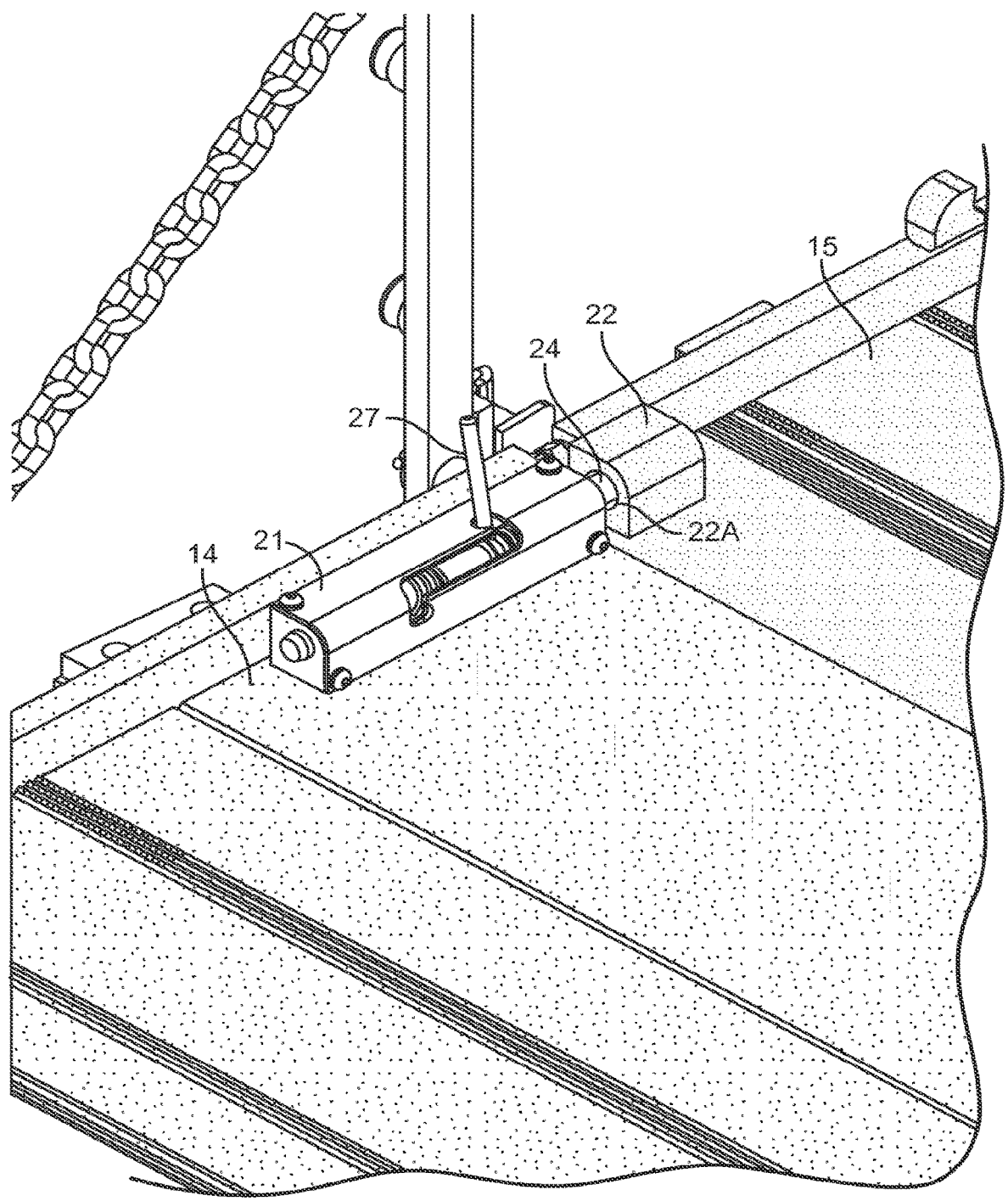
FIG. 17 shows a partial perspective view of the lift gate system of FIG. 9, illustrating details of a locked platform lock and release mechanism on a left side of the lift platform.

FIG. 17 shows a partial perspective view of the lift gate of FIG. 9, illustrating details of a locked platform lock and release mechanism 20 on a left side of the lift platform 12. In the locked position, the mechanism 20 prevents platform sections 15 and 15 from rotating (and buckling) relative to each other.

FIG. 18 shows a partial perspective view of the lift gate of FIG. 9 with the lift platform 21 fully lowered to ground level, and lift platform 12 fully unfolded, illustrating details of a locked platform lock and release mechanism 20 on a left side of the lift platform. FIG. 19 shows a partial perspective view of the lift gate of FIG. 9 with the lift platform fully lowered to ground level, and lift platform fully unfolded, illustrating details of a locked platform lock and release mechanism on a right side of the lift platform.

Figure 20:
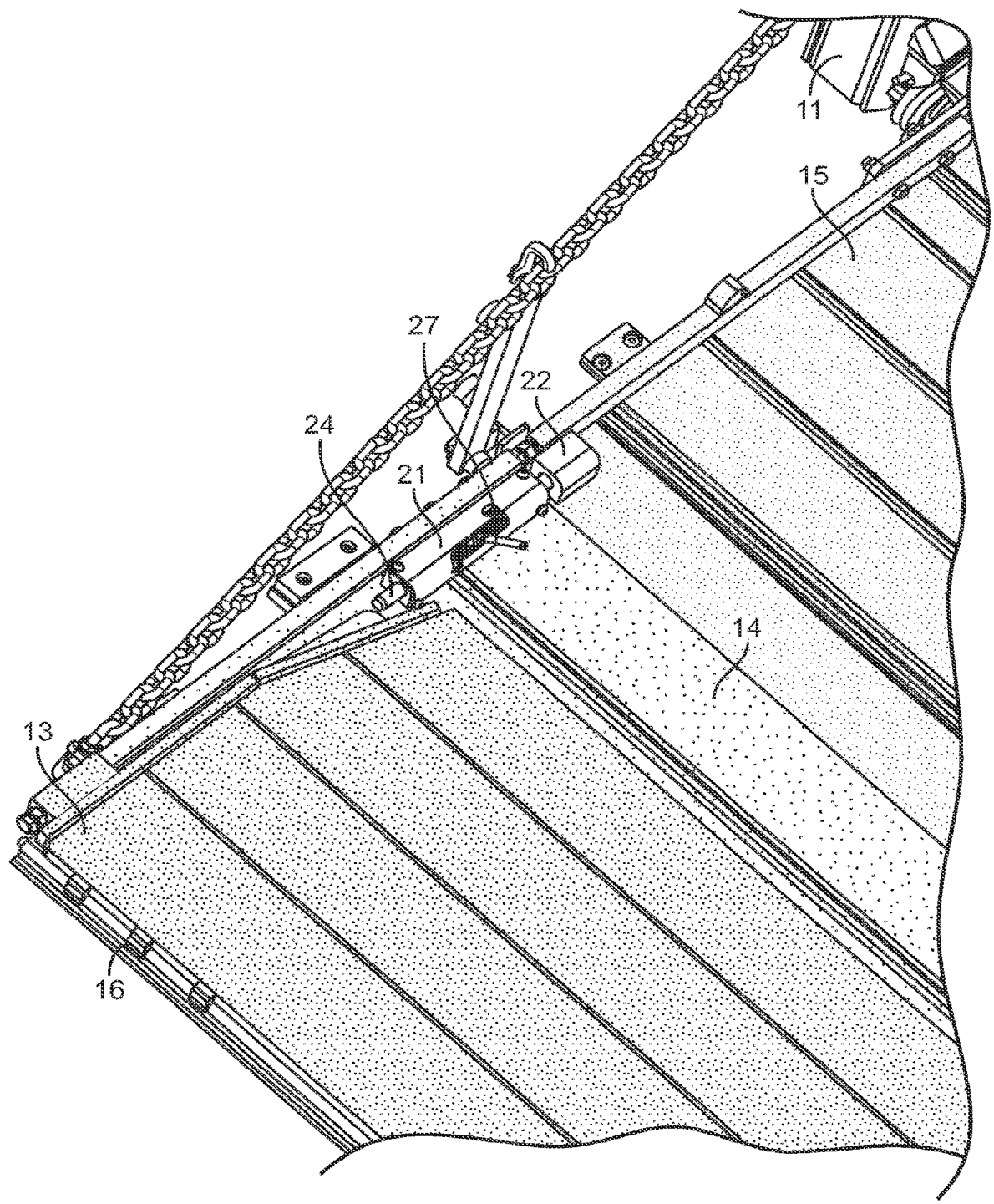
FIG. 20 shows a partial perspective view of the lift gate system of FIG. 9, with the lift platform fully lowered to ground level, and a front most section of the lift platform folded, illustrating details of a platform lock and release mechanism on a left side of the lift platform in a neutral position.

FIG. 20 shows a partial perspective view of the lift gate of FIG. 9 with the lift platform fully lowered to ground level, and a front most section of the lift platform folded, illustrating details of a platform lock and release mechanism on a left side of the lift platform in a neutral position.

Depending on how platform sections are hinged together and their rotational freedom, the platform lock and release mechanism can be selectively placed on the platform sections to selectively lock sections together to prevent relative rotation when loads are placed on the unfolded lift platform.

Though embodiments have been described with reference to certain versions thereof; however, other versions are possible. Therefore, the spirit and scope of the embodiments should not be limited to the description of the preferred versions contained herein.

What is claimed is:

1. A lift gate system, comprising:
a lift gate including:
a foldable lift platform including a first platform section and a second platform section that are adjacent and rotatable relative to one another about a pivot point for folding and unfolding the lift platform;
a lifting mechanism for supporting and moving the lift platform, wherein the first platform section is directly coupled to the lifting mechanism, and the second platform section is pivotally connected to the first platform section; and
at least one lift platform locking mechanism coupled to said two adjacent first and second platform sections of the lift platform proximate the pivot point of the two adjacent platform sections of the lift platform to lock and unlock said two adjacent platform sections together, wherein the at least one locking mechanism includes one or more biasing members, wherein the one or more biasing members are configured to selectively maintain the lock in a locked position and in an unlocked position;
wherein the locking mechanism restricts rotation of said two adjacent platform sections relative to one another in the locked position to maintain the first and second platform sections in the same plane; and
wherein the locking mechanism comprises:
a main body coupled to a first of said two adjacent platform sections;
a bolt lever fixed to a bolt in the main body for sliding the bolt within the main body, wherein the bolt lever protrudes from an elongated opening in the main body, the elongated opening having a retaining structure for releasably engaging and maintaining the bolt lever in a locked position of the lift platform locking mechanism, wherein the main body includes the one or more biasing members for urging the bolt lever against the retaining structure in the locked position of the lift platform locking mechanism;
a bolt holder coupled to a second of said two adjacent platform sections;
the main body slidably maintaining at least a mid portion of the elongated bolt;
such that in the locked position, an end portion of the bolt is maintained by the bolt holder, thereby restricting rotation of said two adjacent platform sections relative to one another.

2. The lift gate system of claim 1, wherein the main body comprises:
a housing having spaced opposing end walls, each end wall having an opening for slidably receiving the bolt; and
the bolt lever is transversely fixed to a portion of the bolt for sliding the bolt within the housing between the end walls.

3. The lift gate system of claim 2, wherein:
the bolt lever protrudes from the elongated opening in the housing, the elongated opening having the retaining structure at an end thereof for releasably engaging the bolt lever in the locked position of the lift platform locking mechanism.

4. The lift gate system of claim 2, wherein:
the lift platform locking mechanism further includes the unlocked position; and
the bolt lever protrudes from the elongated opening in the housing, the elongated opening having a first retaining structure and a second retaining structure at opposing ends thereof, for releasably engaging the bolt lever in locked and unlocked positions of the lift platform locking mechanism, respectively.

5. The lift gate system of claim 1, wherein:
a first biasing member of the one or more biasing members maintains the lock in the locked position.

6. The lift gate system of claim 5, wherein:
a second biasing member of the one or more biasing members maintains the lock in the unlocked position.

7. A lift platform locking mechanism for coupling to a lift platform of a lift gate, the lift platform having a first platform section and second platform section that are adjacent and rotatable relative to one another about a pivot point for folding and unfolding the lift platform, the lift platform locking mechanism comprising:
a main body;
an elongated bolt, the main body slidably maintaining at least a mid portion of the elongated bolt;
a bolt holder for slidably receiving a portion of the elongated bolt; and
one or more biasing members, wherein the one or more biasing members are configured to selectively maintain the lift platform locking mechanism in a locked position and in an unlocked position; and
a bolt lever fixed to the elongated bolt in the main body for sliding the bolt within the main body, wherein the bolt lever protrudes from an elongated opening in the main body, the elongated opening having a retaining structure for releasably engaging and maintaining the bolt lever in a locked position of the lift platform locking mechanism, wherein the main body includes the one or more biasing members for urging the bolt lever against the retaining structure in the locked position of the lift platform locking mechanism;
wherein the lift platform locking mechanism is configured for coupling to said two adjacent first and second platform sections of the lift platform proximate the pivot point of the two adjacent platform sections of the lift platform to lock and unlock said two adjacent platform sections together;
wherein the main body is configured for coupling to a first of said two adjacent platform sections, and the bolt holder is configured for coupling to a second of said two adjacent platform sections;
wherein the lift platform locking mechanism has the locked position, such that:
when the lift platform locking mechanism is in the locked position, an end portion of the bolt is engaged by the bolt holder, thereby restricting rotation of said two adjacent platform sections relative to one another to maintain the first and second platform sections in the same plane; and
when the lift platform locking mechanism is not in the locked position, the bolt is disengaged from the bolt holder, thereby allowing rotation of said two adjacent platform sections relative to one another.

8. The lift platform locking mechanism of claim 7, wherein the elongated bolt is slidable within the main body.

9. The lift platform locking mechanism of claim 8, wherein in the locked position, an end portion of the bolt is maintained within an opening in the bolt holder, thereby restricting rotation of said two adjacent platform sections relative to one another.

10. The lift platform locking mechanism of claim 9, wherein the main body comprises:
a housing having spaced opposing end walls, each end wall having an opening for slidably receiving the bolt, such that a mid portion of the bolt is maintained in the housing between said opposing end walls; and
the bolt lever is transversely fixed to a mid portion of the bolt maintained in the housing between said opposing end walls, for sliding the bolt within the housing between said end walls.

11. The lift platform locking mechanism of claim 10, wherein:
the bolt lever protrudes from the elongated opening in the housing, the elongated opening having the retaining structure at an end thereof for releasably engaging and maintaining the bolt lever in the locked position of the lift platform locking mechanism.

12. The lift platform locking mechanism of claim 10, wherein:
the bolt lever protrudes from the elongated opening in the housing, the elongated opening having a first retaining structure and a second retaining structure at opposing ends thereof;
the first retaining structure is configured for releasably engaging and maintaining the bolt lever in the locked position of the lift platform locking mechanism; and
the second retaining structure is configured for releasably engaging and maintaining the bolt lever in an unlocked position of the lift platform locking mechanism.

13. The lift platform locking mechanism of claim 12, wherein:
the one or more biasing members include a first biasing member and a second biasing member, wherein the first biasing member maintains the lock in a locked position, and wherein the second biasing member maintains the lock in an unlocked position.

14. The lift platform locking mechanism of claim 13, wherein:
to release the bolt lever from the first retaining structure, the bolt lever is rotated away from the first retaining structure to disengage the bolt lever from the first retaining structure, such that upon disengagement of the bolt lever from the first retaining structure the first biasing member urges the bolt lever to slide the bolt to a neutral position in the main body, between the locked and unlocked positions; and
to release the bolt lever from the second retaining structure, the bolt lever is rotated away from the second retaining structure to disengage the bolt lever from the second retaining structure, such that upon disengagement of the bolt lever from the second retaining structure the second biasing member urges the bolt lever to slide the bolt to the neutral position in the main body, between the locked and unlocked positions.

15. The lift platform locking mechanism of claim 7, wherein:
to release the lift platform locking mechanism from the locked position, the bolt lever is rotated away from the retaining structure to disengage the bolt lever from the retaining structure, such that upon disengagement of the bolt lever from the retaining structure the one or more biasing members urge the bolt lever to slide the bolt to a neutral position in the main body.

16. A lift gate system, comprising:
a lift gate including:
- a foldable lift platform including a first platform section and a second platform section that are adjacent and rotatable relative to one another about a pivot point for folding and unfolding the lift platform;
- a lifting mechanism for supporting and moving the lift platform, wherein the first platform section is directly coupled to the lifting mechanism, and the second platform section is pivotally connected to the first platform section;
- at least one lift platform locking mechanism coupled to said two adjacent first and second platform sections of the lift platform proximate the pivot point of the two adjacent platform sections of the lift platform to lock and unlock said two adjacent platform sections together, wherein the at least one locking mechanism includes one or more biasing members, wherein the one or more biasing members are configured to selectively maintain the lock in a locked position and in an unlocked position;
a main body configured for coupling to a first of said two adjacent platform sections; and
a bolt holder configured for coupling to a second of said two adjacent platform sections;
wherein the locking mechanism has the locked position and the unlocked position, such that:
- in the locked position, an end portion of the bolt is engaged by the bolt holder whereby the locking mechanism restricts rotation of said two adjacent platform sections relative to one another to maintain the first and second platform sections in the same plane, wherein in the locked position the bolt engaged by the bolt holder prevents downward and upward pivotal movement of the second platform section about the pivot point with respect to the first platform section, and
- in the unlocked position, the bolt is disengaged from the bolt holder, thereby allowing rotation of said two adjacent platform sections relative to one another for folding the lift platform.

17. The lift gate system of claim 16 further comprising:
a bolt lever fixed to a bolt in the main body for sliding the bolt within the main body, wherein the bolt lever protrudes from an elongated opening in the main body, the elongated opening having a retaining structure for releasably engaging and maintaining the bolt lever in a locked position of the lift platform locking mechanism, wherein the main body includes the one or more biasing members for urging the bolt lever against the retaining structure in the locked position of the lift platform locking mechanism, wherein:
the bolt is slidable within the main body between the locked and unlocked positions, such that in the locked position, an end portion of the bolt is maintained within an opening in the bolt holder, thereby restricting rotation of said two adjacent platform sections relative to one another; and
the main body comprises:
- a housing having spaced opposing end walls, each end wall having an opening for slidably receiving the bolt, such that a mid portion of the bolt is maintained in the housing between said opposing end walls; and
- the bolt lever is transversely fixed to a mid portion of the bolt maintained in the housing between said opposing end walls, for sliding the bolt within the housing between the locked and unlocked positions.

18. The lift gate system of claim 17, wherein:
the bolt lever protrudes from the elongated opening in the housing, the elongated opening having a first retaining structure and a second retaining structure at opposing ends thereof;
the first retaining structure is configured for releasably engaging and maintaining the bolt lever in the locked position of the lift platform locking mechanism; and
the second retaining structure is configured for releasably engaging and maintaining the bolt lever in the unlocked position of the lift platform locking mechanism.

19. The lift gate system of claim 18, wherein:
the one or more biasing members include a first biasing member and a second biasing member, wherein the first biasing member maintains the lock in a locked position, and wherein the second biasing member maintains the lock in an unlocked position.

20. The lift gate system of claim 19, wherein:
to release the bolt lever from the first retaining structure, the bolt lever is manually urged against the first biasing member and rotated away from the first retaining structure to disengage the bolt lever from the retaining structure, such that upon disengagement of the bolt lever from the first retaining structure the first biasing member urges the bolt lever to slide the bolt to a neutral position in the main body, between the locked and unlocked positions; and
to release the bolt lever from the second retaining structure, the bolt lever is manually urged against the second biasing member and rotated away from the second retaining structure to disengage the bolt lever from the second retaining structure, such that upon disengagement of the bolt lever from the second retaining structure the first biasing member urges the bolt lever to slide the bolt to the neutral position in the main body, between the locked and unlocked positions.

* * * * *